United States Patent
McKenna et al.

(10) Patent No.: US 12,367,262 B2
(45) Date of Patent: Jul. 22, 2025

(54) FEATURE SELECTION BASED AT LEAST IN PART ON TEMPORALLY STATIC FEATURE SELECTION CRITERIA AND TEMPORALLY DYNAMIC FEATURE SELECTION CRITERIA

(71) Applicant: Optum Services (Ireland) Limited, Dublin (IE)

(72) Inventors: Ciarán McKenna, Dublin (IE); Eugene E. Farrell, County Galway (IE); Kaj K. Poulsen, Corcoran, MN (US)

(73) Assignee: Optum Services (Ireland) Limited, Dublin (IE)

( * ) Notice: Subject to any disclaimer, the term of this patent is extended or adjusted under 35 U.S.C. 154(b) by 806 days.

(21) Appl. No.: 17/548,987

(22) Filed: Dec. 13, 2021

(65) Prior Publication Data
US 2023/0186354 A1    Jun. 15, 2023

(51) Int. Cl.
| | |
|---|---|
| *G06F 18/22* | (2023.01) |
| *G06F 18/211* | (2023.01) |
| *G06F 18/2431* | (2023.01) |
| *G06Q 30/0282* | (2023.01) |

(52) U.S. Cl.
CPC .......... *G06F 18/22* (2023.01); *G06F 18/211* (2023.01); *G06F 18/2431* (2023.01); *G06Q 30/0282* (2013.01)

(58) Field of Classification Search
None
See application file for complete search history.

(56) References Cited

U.S. PATENT DOCUMENTS

| | | | | |
|---|---|---|---|---|
| 5,638,465 | A * | 6/1997 | Sano | G06T 7/0006 |
| | | | | 382/281 |
| 10,606,983 | B2 | 3/2020 | Thesman | |
| 11,010,716 | B2 | 5/2021 | Thesman | |
| 11,941,502 | B2 * | 3/2024 | MacManus | G06F 18/2185 |
| 12,008,441 | B2 * | 6/2024 | MacManus | G06N 20/00 |
| 12,033,087 | B2 * | 7/2024 | MacManus | G06F 17/15 |

(Continued)

OTHER PUBLICATIONS

"Building a Robust Star Improvement Strategy," CitiusTech—CMS Star Improvement, (Year 2021), (6 pages), (Online), [Retrieved from the Internet Aug. 23, 2021] <URL: https://web.citiustech.com/healthtech/cms-star-improvement>.

(Continued)

*Primary Examiner* — Ryan Barrett
(74) *Attorney, Agent, or Firm* — ALSTON & BIRD LLP

(57) ABSTRACT

There is a need to accurate and efficient feature selection. In one example, embodiments comprise, determining refined statically eligible feature category combinations and refined dynamically eligible feature category combinations. One or more refined eligible feature category combinations and a plurality of eligible feature combinations may be determined based at least in part on the refined statically eligible feature category combinations and the refined dynamically eligible feature category combinations. For each eligible feature combination, an aggregate distance score is determined. A refined feature combination is then determined based at least in part on each aggregate distance score. One or more action are performed based at least in part on the refined feature combination.

20 Claims, 13 Drawing Sheets

(56) References Cited

U.S. PATENT DOCUMENTS

| | | | | |
|---|---|---|---|---|
| 12,131,264 B2* | 10/2024 | MacManus | | G06N 5/04 |
| 12,182,670 B1* | 12/2024 | Beauchesne | | H04L 63/1416 |
| 2003/0195883 A1* | 10/2003 | Mojsilovic | | G06V 10/40 |
| 2005/0097435 A1* | 5/2005 | Prakash | | H04L 51/212 |
| | | | | 715/205 |
| 2006/0212142 A1* | 9/2006 | Madani | | G06F 16/353 |
| | | | | 707/E17.09 |
| 2012/0033863 A1* | 2/2012 | Wojton | | A61B 5/0077 |
| | | | | 382/128 |
| 2012/0283574 A1* | 11/2012 | Park | | G06F 18/253 |
| | | | | 600/476 |
| 2012/0303378 A1 | 11/2012 | Lieberman | | |
| 2013/0315477 A1* | 11/2013 | Murray | | G06F 16/583 |
| | | | | 382/159 |
| 2014/0330621 A1 | 11/2014 | Nichols et al. | | |
| 2016/0063516 A1* | 3/2016 | Terrazas | | G06V 10/56 |
| | | | | 705/7.29 |
| 2016/0232321 A1* | 8/2016 | Silverman | | G16H 50/30 |
| 2017/0213108 A1* | 7/2017 | Bergsma | | G06F 18/22 |
| 2018/0121820 A1* | 5/2018 | Manasse | | G06F 17/18 |
| 2018/0342060 A1* | 11/2018 | Yao | | G06Q 10/10 |
| 2021/0097220 A1* | 4/2021 | Bhunia | | G06N 7/01 |
| 2021/0342652 A1* | 11/2021 | Glassman | | G06F 18/251 |
| 2022/0095871 A1* | 3/2022 | Jakhotia | | A47L 11/28 |
| 2022/0292856 A1* | 9/2022 | Stonehouse | | G06V 20/52 |
| 2024/0193462 A1* | 6/2024 | O'Hara | | G06N 20/00 |

OTHER PUBLICATIONS

"Standard Error of the Proportion," Chegg, (Online), (8 pages), [Retrieved from the Internet Apr. 8, 2022] <https://www.chegg.com/homework-help/definitions/standard-error-of-the-proportion-31>.

"Stars Planner for Medicare Advantage," Baltimore Health Analytics LLC, (Year 2017), (7 pages), Available online: https://baltimorehealthanalytics.com/assets/webapps/help_docs/stars_planner_v1.pdf.

Budhiraja, Puneet et al. "Improving Medicare Advantage Star Ratings: An Analytical Framework," Health Watch, Issue 87, Oct. 2018, pp. 21-24.

Johnson, Joe. "Quality in the Healthcare Marketplace: Becoming a Rising 'Star'," L.E.K. Consulting/Executive Insights, vol. XIV, Issue 14, (Year: 2012), (5 pages).

Smyth, Danielle. "How to Calculate Sampling Error for Percentages," Sapling, Oct. 29, 2021, (10 pages), [Retrieved from the Internet Apr. 8, 2022] <https://www.sapling.com/6183888/calculate-sampling-error-percentages>.

Suh, Joon Won. "Evaluating the Relationship Between Health Plan Characteristics and CMS Quality Scores," Thesis, (Year: 2021), (42 pages), University of California, Los Angeles.

* cited by examiner

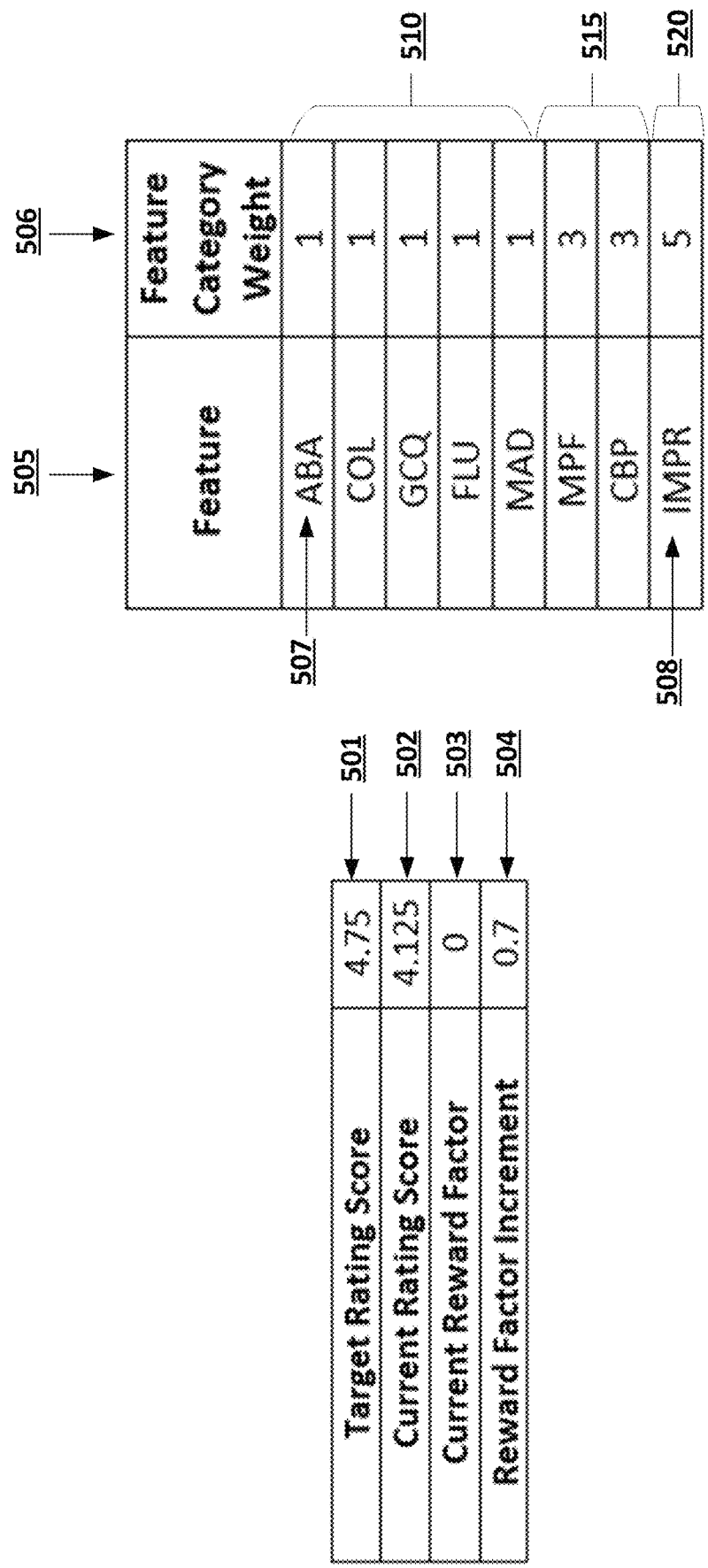

| Feature | Current Distance Measure | Historical Distance Measure |
|---|---|---|
| ABA | 5.5 | 4 |
| COL | 10 | 1 |
| GCQ | 8.25 | 10 |
| FLU | 6 | 3 |
| MAD | 16 | 1 |
| MPF | 7 | 4 |
| CBP | 2.2 | 1 |

1701 →
$$\begin{bmatrix} 5.5 & 10 & 7 \\ 5.5 & 8.25 & 7 \\ 5.5 & 6 & 7 \\ 5.5 & 16 & 7 \\ 5.5 & 10 & 2.2 \\ 5.5 & 8.25 & 2.2 \\ 5.5 & 6 & 2.2 \\ 5.5 & 16 & 2.2 \\ 10 & 8.25 & 7 \\ 10 & 6 & 7 \\ 10 & 16 & 7 \\ \vdots & \vdots & \vdots \end{bmatrix}$$

1750 →
$$\begin{bmatrix} 22.5 \\ 20.75 \\ 18.5 \\ 28.5 \\ 17.7 \\ 15.95 \\ 13.7 \\ 23.7 \\ 25.25 \\ 23 \\ 33 \\ \vdots \end{bmatrix}$$

1801 →
$$\begin{bmatrix} 4 & 1 & 4 \\ 4 & 10 & 4 \\ 4 & 3 & 4 \\ 4 & 1 & 4 \\ 4 & 4 & 1 \\ 4 & 10 & 1 \\ 4 & 3 & 1 \\ 4 & 1 & 1 \\ 1 & 1 & 4 \\ 1 & 10 & 4 \\ 1 & 3 & 4 \\ \vdots & \vdots & \vdots \end{bmatrix}$$

1850 →
$$\begin{bmatrix} 9 \\ 18 \\ 11 \\ 9 \\ 9 \\ 15 \\ 8 \\ 6 \\ 6 \\ 15 \\ 8 \\ \vdots \end{bmatrix}$$

FIG. 18B

FEATURE SELECTION BASED AT LEAST IN PART ON TEMPORALLY STATIC FEATURE SELECTION CRITERIA AND TEMPORALLY DYNAMIC FEATURE SELECTION CRITERIA

BACKGROUND

Various embodiments of the present invention address technical challenges related to performing prescriptive data analysis in a computationally efficient and prescriptively reliable manner. In particular, various embodiments of the present invention relate to performing feature selection based at least in part on temporally static feature selection criteria and temporally dynamic feature selection criteria.

BRIEF SUMMARY

In general, embodiments of the present invention provide methods, apparatuses, systems, computing devices, computing entities, and/or the like for feature selection based at least in part on both temporally static feature selection criteria and temporally dynamic feature selection criteria.

In accordance with one aspect, a method includes: identifying a plurality of features, wherein: (i) each feature is associated with a feature category of a plurality of feature categories, (ii) each feature category is associated with a feature category weight of a plurality of feature category weights, and (iii) each feature is associated with a current distance measure and a historical distance measure; determining a plurality of statically eligible feature category combinations, wherein: (i) each statically eligible feature category combination is characterized by a plurality of static feature category counts for the plurality of feature categories, (ii) each statically eligible feature category combination is associated with a static cumulative weight that satisfies a static cumulative weight threshold, and (iii) each static cumulative weight for a particular statically eligible feature category combination is determined based at least in part on the plurality of static feature category counts for the particular statically eligible feature category combination and the plurality of feature category weights; determining one or more refined statically eligible feature category combinations by filtering the plurality of statically eligible feature category combinations based at least in part on one or more static refinement constraints; determining a plurality of dynamically eligible feature category combinations, wherein: (i) each dynamically eligible feature category combination is characterized by a plurality of dynamic feature category counts for the plurality of feature categories, (ii) each dynamically eligible feature category combination is associated with a dynamic cumulative weight that satisfies a dynamic cumulative weight threshold, and (iii) each dynamic cumulative weight for a particular dynamically eligible feature category combination is determined based at least in part on the plurality of dynamic feature category counts for the particular dynamically eligible feature category combination and the plurality of feature category weights; determining one or more refined dynamically eligible feature category combinations by filtering the plurality of dynamically eligible feature category combinations based at least in part on one or more dynamic refinement constraints; determining one or more refined eligible feature category combinations by filtering the one or more refined statically eligible feature category combinations based at least in part on the one or more refined dynamically eligible feature category combinations; determining a plurality of eligible feature combinations, wherein the plurality of eligible feature combinations comprise, for each refined eligible feature category combination, a plurality of conforming feature combinations; for each eligible feature combination, determining an aggregate distance measure based at least in part on at least one of each current distance measure for the eligible feature combination or each historical distance measure for the eligible feature combination; determining a refined eligible feature category combination based at least in part on each aggregate distance measure; and performing one or more actions based at least in part on the refined eligible feature category combination.

In accordance with another aspect, an apparatus comprising at least one processor and at least one memory including program code, the at least one memory and the program code configured to, with the processor, cause the apparatus to at least: identify a plurality of features, wherein: (i) each feature is associated with a feature category of a plurality of feature categories, (ii) each feature category is associated with a feature category weight of a plurality of feature category weights, and (iii) each feature is associated with a current distance measure and a historical distance measure; determine a plurality of statically eligible feature category combinations, wherein: (i) each statically eligible feature category combination is characterized by a plurality of static feature category counts for the plurality of feature categories, (ii) each statically eligible feature category combination is associated with a static cumulative weight that satisfies a static cumulative weight threshold, and (iii) each static cumulative weight for a particular statically eligible feature category combination is determined based at least in part on the plurality of static feature category counts for the particular statically eligible feature category combination and the plurality of feature category weights; determine one or more refined statically eligible feature category combinations by filtering the plurality of statically eligible feature category combinations based at least in part on one or more static refinement constraints; determine a plurality of dynamically eligible feature category combinations, wherein: (i) each dynamically eligible feature category combination is characterized by a plurality of dynamic feature category counts for the plurality of feature categories, (ii) each dynamically eligible feature category combination is associated with a dynamic cumulative weight that satisfies a dynamic cumulative weight threshold, and (iii) each dynamic cumulative weight for a particular dynamically eligible feature category combination is determined based at least in part on the plurality of dynamic feature category counts for the particular dynamically eligible feature category combination and the plurality of feature category weights; determine one or more refined dynamically eligible feature category combinations by filtering the plurality of dynamically eligible feature category combinations based at least in part on one or more dynamic refinement constraints; determine one or more refined eligible feature category combinations by filtering the one or more refined statically eligible feature category combinations based at least in part on the one or more refined dynamically eligible feature category combinations; determine a plurality of eligible feature combinations, wherein the plurality of eligible feature combinations comprise, for each refined eligible feature category combination, a plurality of conforming feature combinations; for each eligible feature combination, determine an aggregate distance measure based at least in part on at least one of each current distance measure for the eligible feature combination or each historical distance measure for the eligible feature combination;

determine a refined eligible feature category combination based at least in part on each aggregate distance measure; and perform one or more actions based at least in part on the refined eligible feature category combination.

In accordance with yet another aspect, a computer program product computer program comprising at least one non-transitory computer-readable storage medium having computer-readable program code portions stored therein, the computer-readable program code portions configured to: identify a plurality of features, wherein: (i) each feature is associated with a feature category of a plurality of feature categories, (ii) each feature category is associated with a feature category weight of a plurality of feature category weights, and (iii) each feature is associated with a current distance measure and a historical distance measure; determine a plurality of statically eligible feature category combinations, wherein: (i) each statically eligible feature category combination is characterized by a plurality of static feature category counts for the plurality of feature categories, (ii) each statically eligible feature category combination is associated with a static cumulative weight that satisfies a static cumulative weight threshold, and (iii) each static cumulative weight for a particular statically eligible feature category combination is determined based at least in part on the plurality of static feature category counts for the particular statically eligible feature category combination and the plurality of feature category weights; determine one or more refined statically eligible feature category combinations by filtering the plurality of statically eligible feature category combinations based at least in part on one or more static refinement constraints; determine a plurality of dynamically eligible feature category combinations, wherein: (i) each dynamically eligible feature category combination is characterized by a plurality of dynamic feature category counts for the plurality of feature categories, (ii) each dynamically eligible feature category combination is associated with a dynamic cumulative weight that satisfies a dynamic cumulative weight threshold, and (iii) each dynamic cumulative weight for a particular dynamically eligible feature category combination is determined based at least in part on the plurality of dynamic feature category counts for the particular dynamically eligible feature category combination and the plurality of feature category weights; determine one or more refined dynamically eligible feature category combinations by filtering the plurality of dynamically eligible feature category combinations based at least in part on one or more dynamic refinement constraints; determine one or more refined eligible feature category combinations by filtering the one or more refined statically eligible feature category combinations based at least in part on the one or more refined dynamically eligible feature category combinations; determine a plurality of eligible feature combinations, wherein the plurality of eligible feature combinations comprise, for each refined eligible feature category combination, a plurality of conforming feature combinations; for each eligible feature combination, determine an aggregate distance measure based at least in part on at least one of each current distance measure for the eligible feature combination or each historical distance measure for the eligible feature combination; determine a refined eligible feature category combination based at least in part on each aggregate distance measure; and perform one or more actions based at least in part on the refined eligible feature category combination.

BRIEF DESCRIPTION OF THE DRAWINGS

Figure 1:
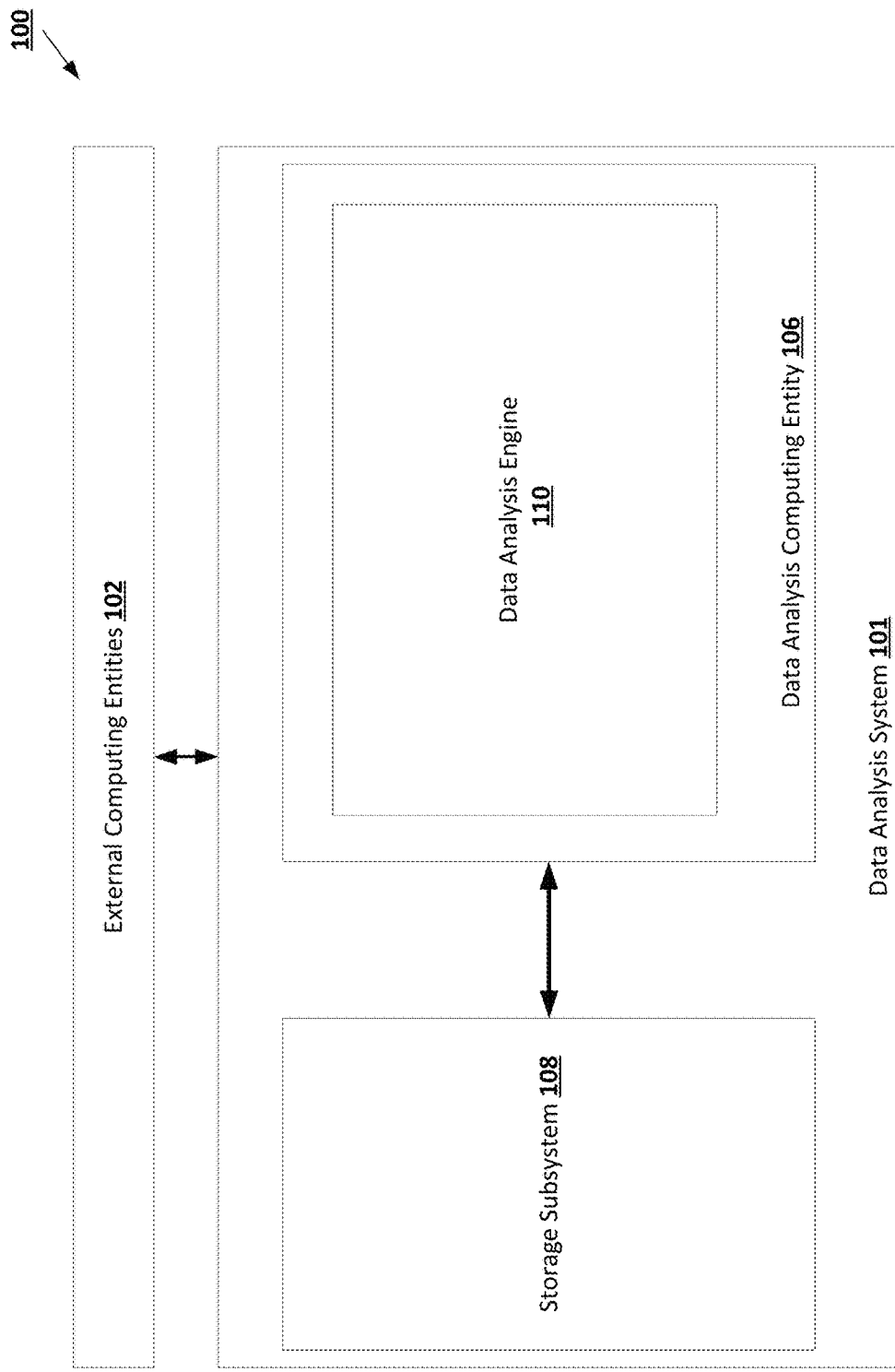
Figure 2:
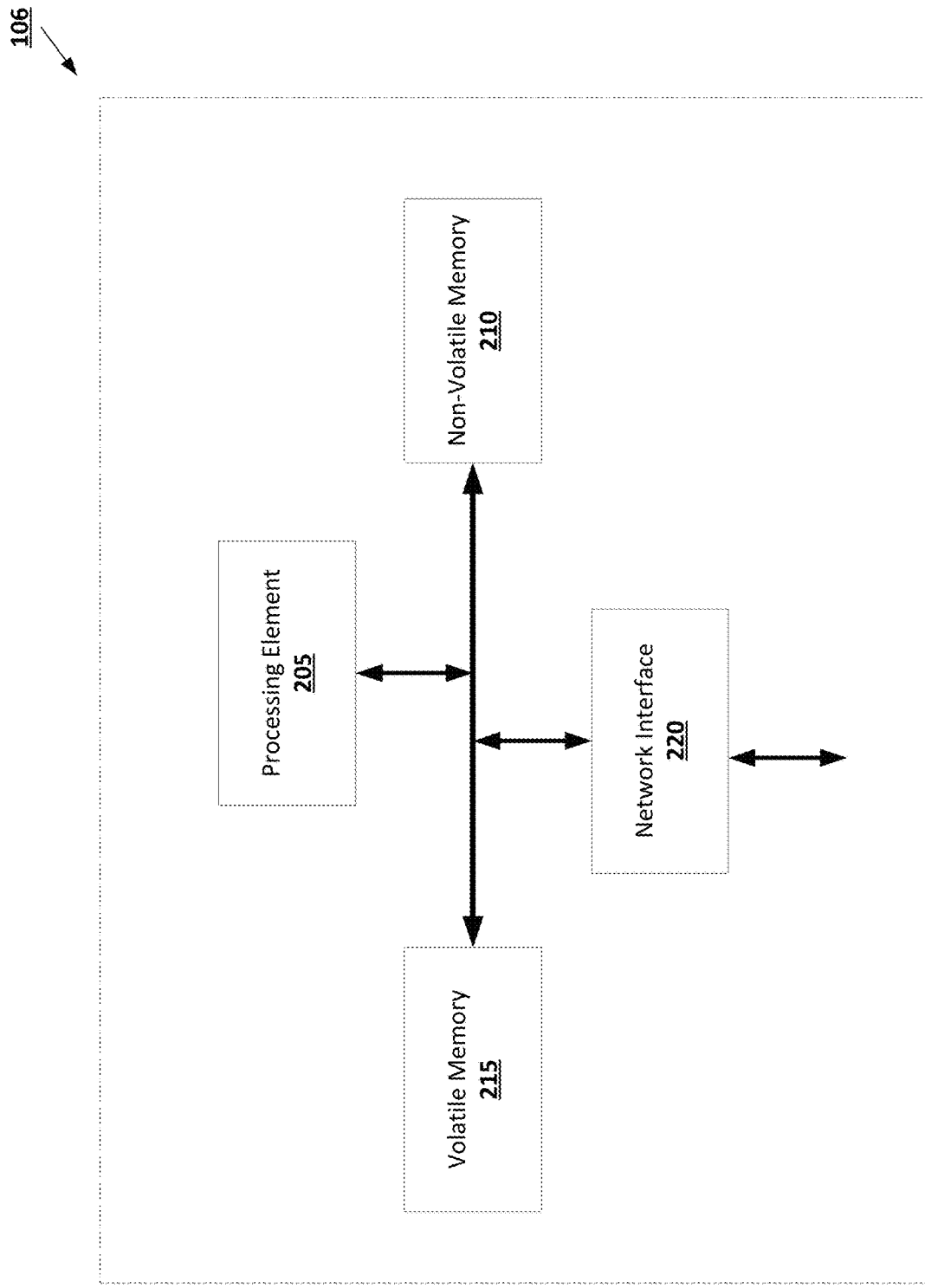
Figure 3:
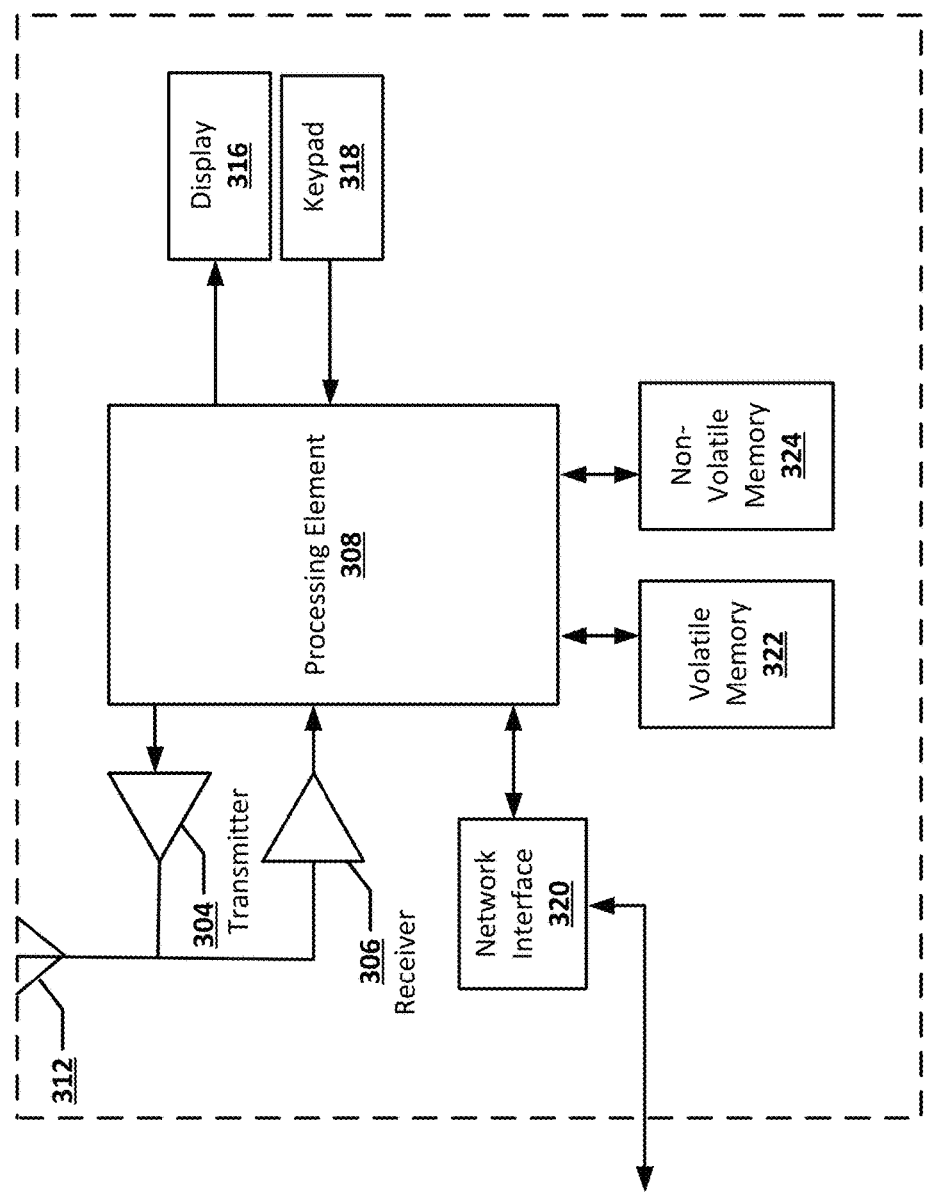
Figure 4:
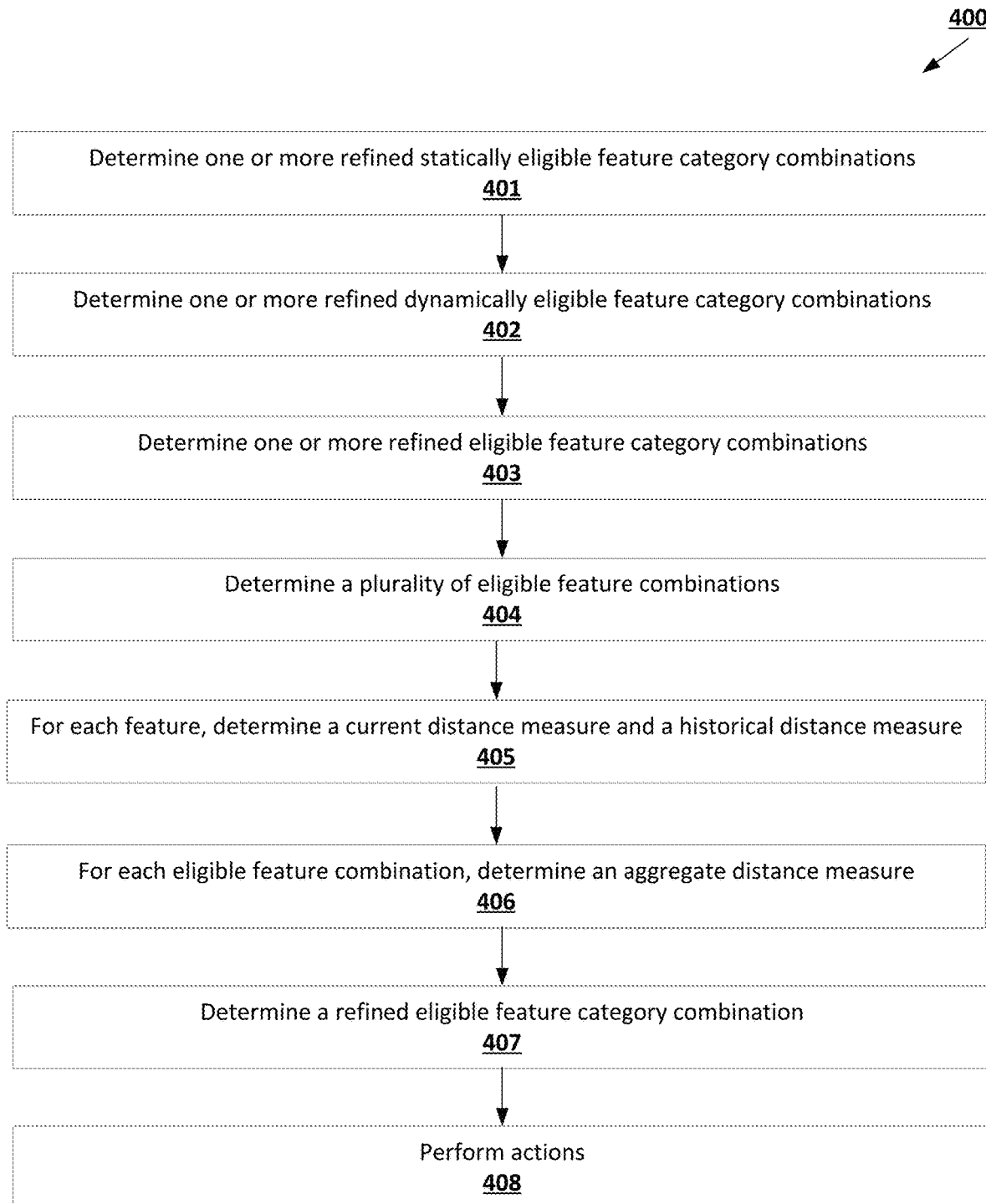
Figure 7:
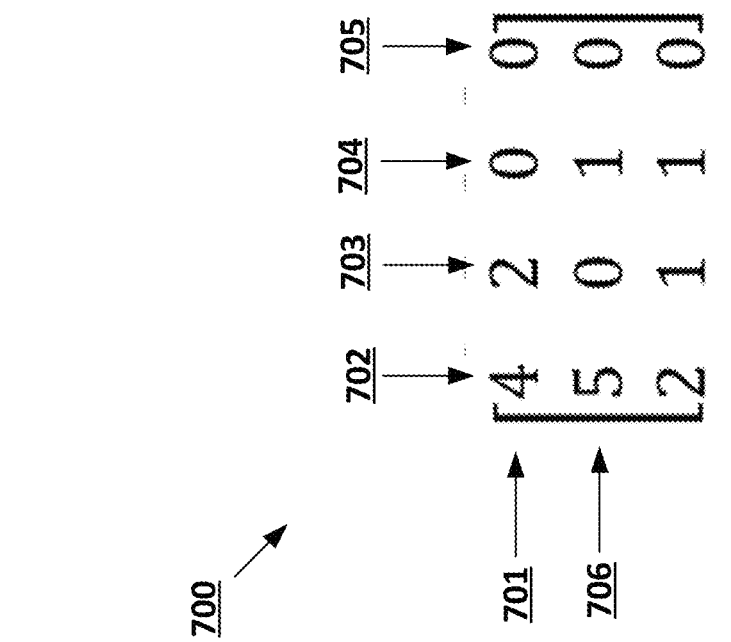
Figure 6:
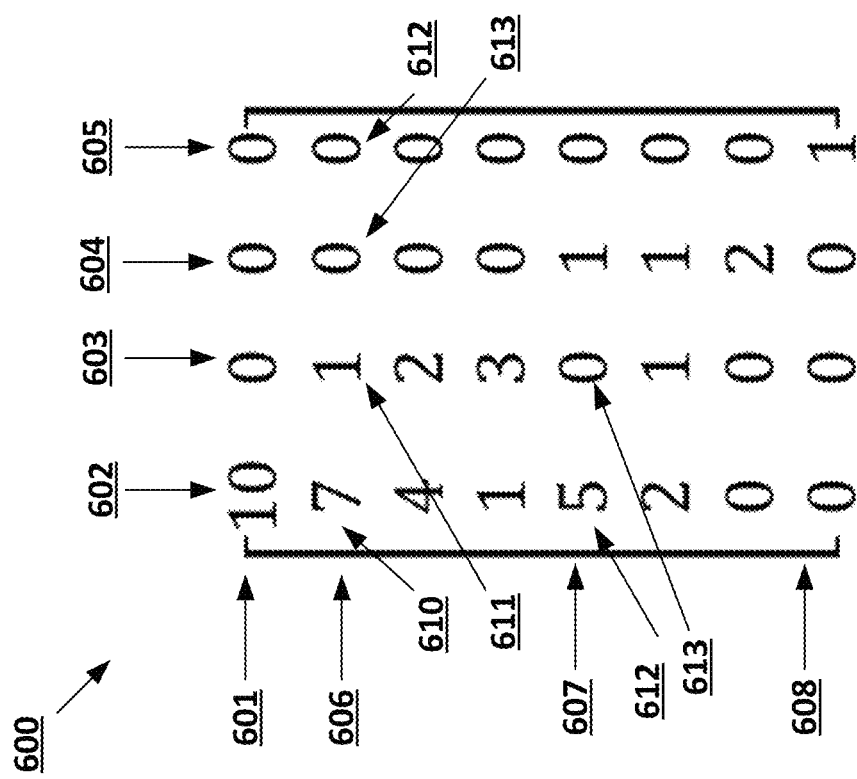
Figure 11:
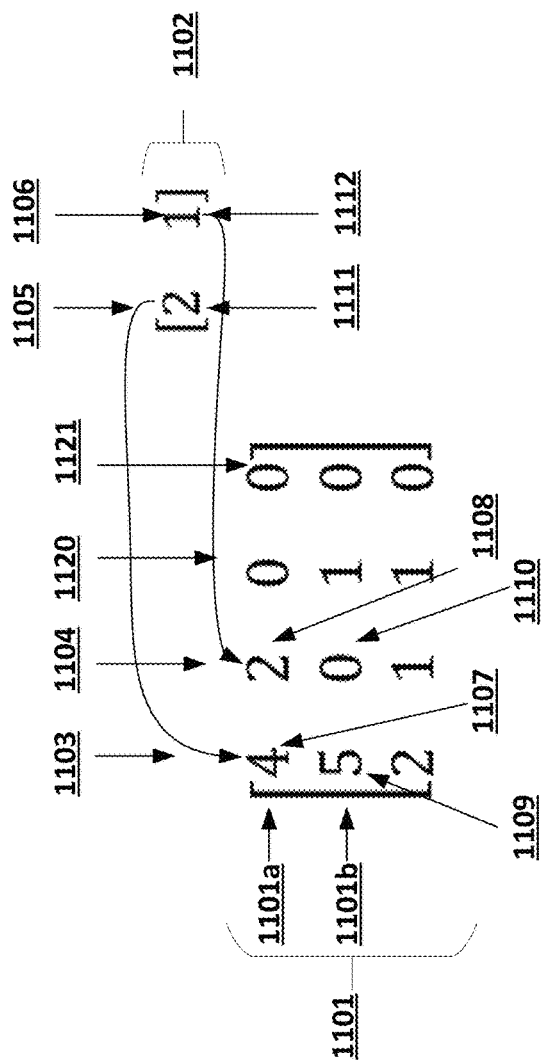
Figure 12:
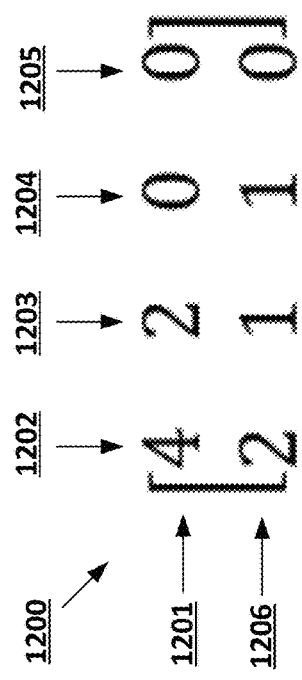
Figure 13:
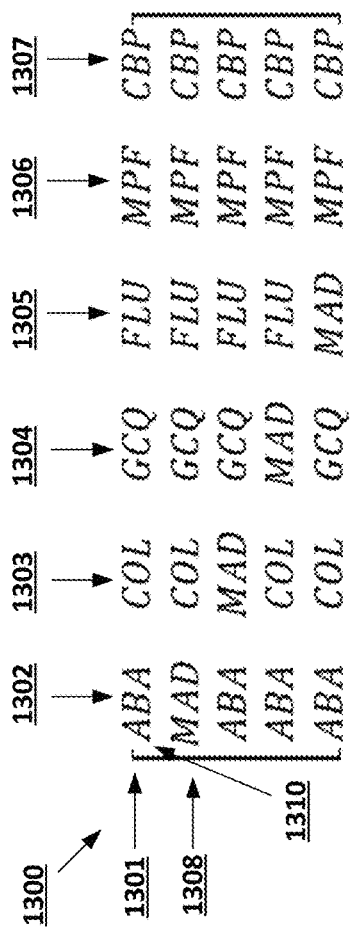
Figure 14:
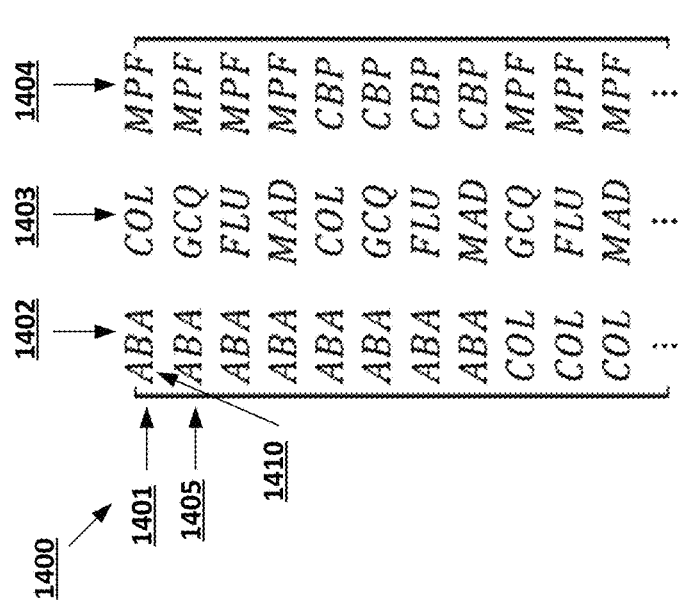
Figure 19:
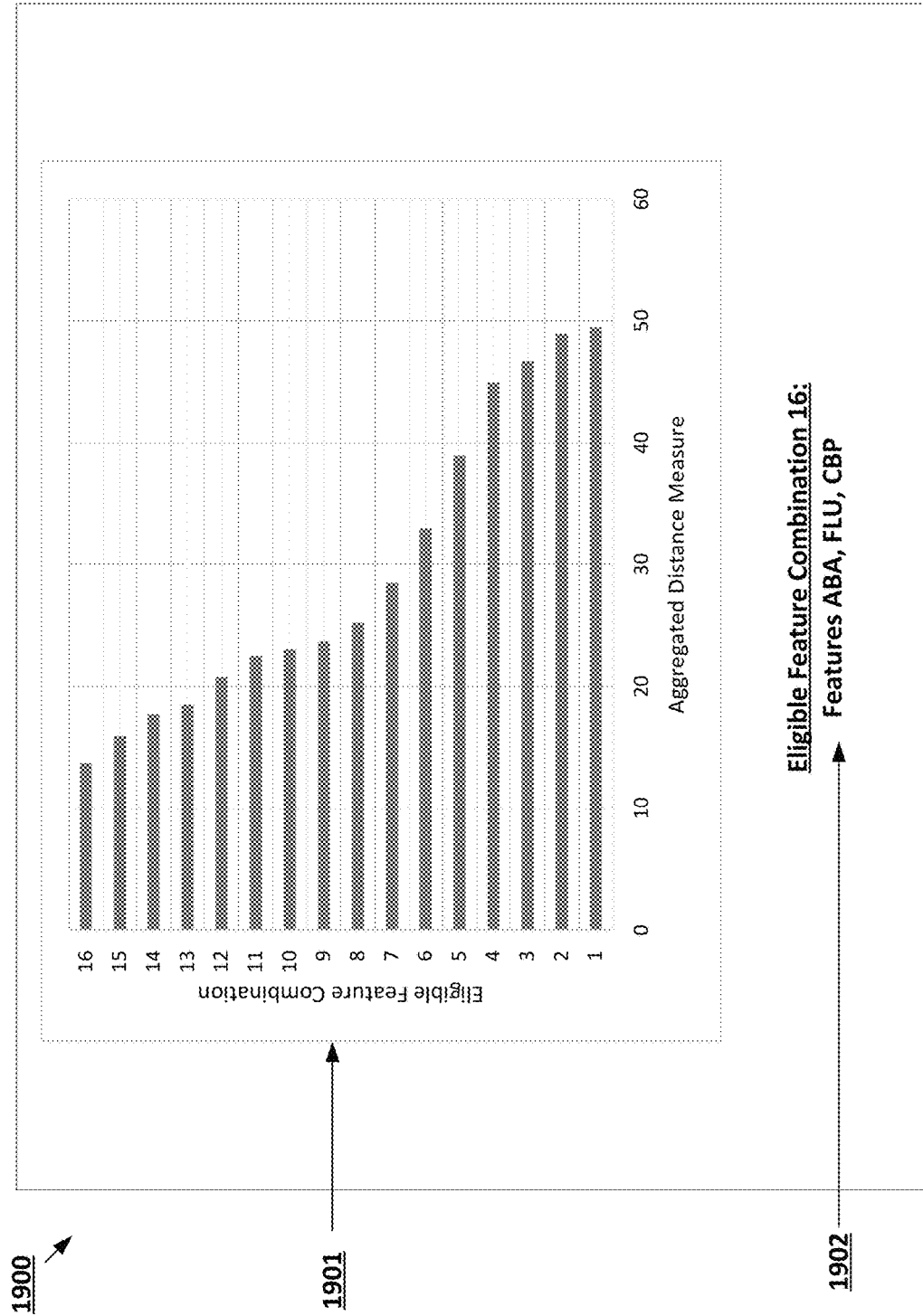

Having thus described the invention in general terms, reference will now be made to the accompanying drawings, which are not necessarily drawn to scale, and wherein:

FIG. 1 provides an exemplary overview of an architecture that can be used to practice embodiments of the present invention;

FIG. 2 provides an example data analysis computing entity in accordance with some embodiments discussed herein;

FIG. 3 provides an example external computing entity in accordance with some embodiments discussed herein;

FIG. 4 is a flowchart diagram of an example process for prescriptive feature selection in accordance with some embodiments discussed herein;

FIGS. 5A-B provide operational examples of a plurality of features and feature category weights for use in a statically eligible feature category combination determination in accordance with some embodiments discussed herein;

FIG. 6 provides an operational example of a plurality of statically eligible feature category combinations in accordance with some embodiments discussed herein;

FIG. 7 provides an operational example of one or more refined statically eligible feature category combinations in accordance with some embodiments discussed herein;

FIG. 8 provides an operational example of a plurality of features and feature category weights for use in a dynamically eligible feature category combination determination in accordance with some embodiments discussed herein;

FIG. 9 provides an operational example of a plurality of dynamically eligible feature category combinations in accordance with some embodiments discussed herein;

FIG. 10 provides an operational example of one or more refined dynamically eligible feature category combinations in accordance with some embodiments discussed herein;

FIGS. 11-12 provide operational examples of determining one or more refined eligible feature category combinations in accordance with some embodiments discussed herein;

FIGS. 13-14 provide operational examples of a plurality of conforming feature combinations in accordance with some embodiments discussed herein;

FIG. 15 provides an operational example of current distance measures and historical distance measures for a plurality of features in accordance with some embodiments discussed herein;

FIGS. 16A-B, 17A-B, and 18A-B provide operational examples of determining an aggregated distance measure for each eligible feature combination in accordance with some embodiments discussed herein; and FIG. 19 provides an operational example of a recommended feature combination data object d in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to data analysis, one of ordinary skill in the art will recognize that the disclosed concepts can be used to perform other types of data analysis.

I. OVERVIEW AND TECHNICAL ADVANTAGES

Various embodiments of the present invention address technical challenges related to performing feature selection based at least in part on temporally static feature selection criteria and temporally dynamic feature selection criteria. For example, various embodiments of the present inventions identify a plurality of features each associated with a feature category weight, a current distance measure, and historical distance measure and determine a plurality of statically eligible feature category combinations as well as a plurality of dynamically eligible feature combinations of the plurality of features. As another example, various embodiments of the present invention reduce the statically eligible feature category combinations as well as a plurality of dynamically eligible feature combinations by filtering for the eligible feature combinations that satisfy one or more static refinement constraints or dynamic refinement constraints, respectively. As yet another example, various embodiments of the present invention determine a plurality of eligible feature combinations and determine an aggregate distance measure for each eligible feature combination. A refined eligible feature category combination may be determined based at least in part on each aggregate distance measure and one or more action may be performed based at least in part on the refined eligible feature category combination. By using the noted techniques, various embodiments of the present invention provide for accurate and efficient feature selection to determine an efficient feature combination to achieve a target rating score by considering both temporally static feature selection criteria and temporally dynamic static feature selection criteria, which allows for more accurate and efficient feature selection.

A rating category may be categorical in nature with each rating category defined by one or more rating score thresholds. A rating score for a service entity may be determined based at least in part on a plurality of feature scores and a rating category may be assigned to the service entity based at least in part on the rating score determined for the service entity. For example, Centers for Medicare & Medicaid Services (CMS) may assign a CMS star rating to a contract with a health insurance provider based at least in part on the health insurance provider's various drug and health plans, which are evaluated using various features and assigning each feature a particular feature score. A star category may then be assigned to the health insurance provider based at least in part on the plurality of feature scores for the health insurance provider, where a star category may range from a 1 star category to a 5 star category increasing by half integer increments. The health insurance provider may be rewarded and/or penalized based at least in part on their associated star category.

Conventionally, feature selection determinations have required manually intense computation to explore viable feature combinations. For example, such solutions may make adjustments to a single selected feature and determine an updated rating score and/or updating rating category based at least in part on the adjusted feature. However, such computations are time consuming and inefficient, as it is unknown whether the selected adjusted feature will change the rating score until after determining the updated rating score. Further, due to the adjustment of single selected features, such conventional methods only examine a limited number of combinations. Within a particular year, there may be up to 50 eligible features (e.g., survey results, compliance on prescribed drug adherence, etc.) which are evaluated for the contract and which are used to assign a CMS star rating to the health insurance provider. As such, there may be up to 50! possible combinations per contract.

Additionally, such conventional methods do not consider the impact of temporally dynamic feature selection criteria and/or reward factor criteria. The temporally dynamic feature selection criteria may be determined based at least in part on current feature values as compared to historical feature values and the reward factor criteria may be determined based at least in part on an associated rating score and variance as compared to other rating scores and variances within the industry.

Various embodiments of the present invention address technical challenges related to providing feature selection based at least in part on both temporally static feature selection criteria and temporally dynamic feature selection criteria. For example, in some embodiments, proposed solutions disclose identifying a plurality of features and determining a plurality of statically eligible feature category combinations and dynamically eligible feature category combinations. The statically eligible feature category combinations and dynamically eligible feature category combinations may be filtered using one or more static refinement constraints and one or more dynamic refinement constraints, respectively, to determine one or more refine statically eligible feature category combinations and refined dynamically eligible feature category combinations. A plurality of eligible feature combinations may be determined and an aggregate distance measure may be determined for each eligible feature combination. A refined eligible feature category combination may then be determined based at least in part on each aggregate distance measure and one or more actions may be performed based at least in part on the refined eligible feature category combination. In doing so, various embodiments of the present invention address shortcomings of conventional feature selection solutions and enable solutions that are capable of consideration various feature combinations as well as consideration of both temporally static feature selection criteria and temporally dynamic feature selection criteria.

II. DEFINITIONS OF CERTAIN TERMS

The term "feature" may refer to an electronically-managed data construct configured to describe a particular metric that is used to determine a rating category for a particular service entity. A feature may be associated with a particular feature category of plurality of feature categories. In some embodiments, the feature may correspond to a distance category. The distance category be determined based at least in part on an associated feature score for the feature and one or more distance score thresholds for a feature. In some embodiments, a distance category is defined by one or more distance score thresholds. In some embodiments, each feature category is further associated with a feature category weight of a plurality of feature category weights. By way of continuing example, the first feature category may have an associated feature category weight of 1, the second feature category may have an associated feature category weight of 2, the third feature category may have an associated feature category weight of 3, the fourth feature category may have an associated feature category weight of 4, and the fifth feature category may have an associated feature category weight of 5. Furthermore, in some embodiments, each feature may be associated with a current distance measure and a historical distance measure. The current distance measure may be indicative of a relationship between a current feature score and a particular distance score threshold corresponding to the nearest distance category. By way of continuing example, a current distance measure may be determined for the COL feature, which has an associated feature score of 70, which corresponds to a second feature category with an associated feature category weight of 2. The COL feature may define a first distance category, second distance category, third distance category, fourth distance category, and fifth distance category, where the first distance category corresponds to feature scores between 0 and 20, the second distance category corresponds to feature scores between 21 and 40, the third distance category corresponds to feature scores between 41 and 60, the fourth distance category corresponds to feature scores between 61 and 80, and the fifth distance category corresponds to feature scores between 81 and 100. As such, the COL feature may correspond to a fourth distance category and the nearest distance category may be the fifth distance category, which is defined by a lower bounds of 81. As such, the current distance measure may be determined based at least in part on the difference between the current feature score of 60 and the distance score threshold of 81 for the nearest distance category, such that the current distance measure is 11. The historical distance measure may be indicative of a relationship between a particular feature score associated with a historical time frame (e.g., a feature score associated with a prior year) and to the nearest distance category. By way of continuing example, the COL feature may have a historical feature score of 55 corresponding to a third distance category and the nearest distance category may have an associated distance score threshold of 61. In some embodiments, the plurality of feature categories may include a cross-temporal improvement feature category which comprises a cross-temporal improvement feature. In some embodiments, the plurality of feature categories may include a reward factor feature category. The reward factor feature category may include one or more reward factor features. In some embodiments, a reward factor feature may be associated with a reward value. A reward value may by a value which is appended onto a rating score after a rating score has been determined based at least in part on plurality of feature scores.

The term "statically eligible feature category combination" may refer to an electronically-managed data construct that describes a plurality of static feature category counts for the plurality of feature categories. Each statically eligible feature category combination may be associated with a static cumulative weight that satisfies a static cumulative weight threshold. Each static cumulative weight threshold for the statically eligible feature category combination may be determined based at least in part on the plurality of static feature category counts for the particular statically eligible feature category combination and the plurality of feature category weights. Furthermore, each static cumulative weight for a particular statically eligible feature category combination is determined based at least in part on the plurality of static feature category counts for the particular statically eligible feature category combination and the plurality of feature category weights. For example, a particular statically eligible feature category combination may be characterized by a static feature category count of 4 and 2 for a first feature category and a third feature category and a static feature category count of 0 for other feature categories. The statically eligible feature category combination may be associated with a static cumulative weight threshold of 10. The cumulative static weight for the statically eligible feature category combination may be determined based at least in part on the plurality of static feature category counts and the plurality of feature category weights. Since the statically eligible feature category combination is characterized by a static feature category count of 4 and 2 for a first feature category and a third feature category and the first feature category has a feature category weight of 1 and the third feature category has a feature category weight of 3, the static cumulative weight for the statically eligible feature category combination may be 10. The statically cumulative weight of 10 may satisfy the static cumulative weight threshold of 10.

The term "refined statically eligible feature category combination" may refer to an electronically-managed data construct that describes a statically eligible feature category combination that satisfies on one or more static refinement constraints. A static refinement constraint may be based at least in part on a count of features within a particular feature category. In some embodiments, the static count threshold may define an upper bound value for which a particular statically eligible feature category count may not exceed. For example, a first feature category may include 5 features and thus, a static refinement constraint of 5 may apply to the static feature category corresponding to the first feature category. In some embodiments, the one or more static confinement constraints comprise a static count threshold for each feature category.

The term "dynamically eligible feature category combination" may refer to an electronically-managed data construct that describes a plurality of dynamic feature category counts for the plurality of feature categories. Each dynamic eligible feature category combination may be associated with a dynamic cumulative weight that satisfies a dynamic cumulative weight threshold. Each dynamic cumulative weight threshold for the statically eligible feature category combination may be determined based at least in part on the plurality of dynamic feature category counts for the particular dynamically eligible feature category combination and the plurality of feature category weights. Furthermore, each dynamically cumulative weight for a particular dynamically eligible feature category combination is determined based at least in part on the plurality of dynamic feature category counts for the particular dynamically eligible feature category combination and the plurality of feature category weights. For example, a particular dynamically eligible feature category combination may be characterized by a dynamic feature category count of 2 and 1 for a first feature category and a third feature category and a dynamically feature category count of 0 for other feature categories. The dynamically eligible feature category combination may be associated with a dynamic cumulative weight threshold of 5. The cumulative dynamic weight for the dynamically eligible feature category combination may be determined based at least in part on the plurality of dynamic feature category counts and the plurality of feature category weights. Since the dynamically eligible feature category combination is characterized by a dynamic feature category count of 2 and 1 for a first feature category and a third feature category and the first feature category has a feature category weight of 1 and the third feature category has a feature category weight of 3, the dynamic cumulative weight for the dynamically eligible feature category combination may be 5. The dynamically cumulative weight of 5 may satisfy the dynamic cumulative weight threshold of 5.

The term "refined dynamically eligible feature category combination" may refer to an electronically-managed data construct that describes a dynamically eligible feature category combination that satisfies one or more dynamic refinement constraints. A dynamic refinement constraint may be based at least in part on a count of features within a particular feature category. In some embodiments, the dynamic count threshold may define an upper bound value for which a particular dynamically eligible feature category count may not exceed. For example, a first feature category may include 5 features and thus, a static refinement constraint of 5 may apply to the dynamic feature category corresponding to the first feature category.

The term "refined eligible feature category combination" may refer to an electronically-managed data construct that describes one or more refined static feature category counts for the plurality of feature categories that satisfy one or more conditions defined by one or more refined dynamically eligible feature category combinations. In some embodiments, one or more refined static feature category counts each corresponding to a particular feature category are compared to one or more refined dynamic feature category counts each corresponding to the same feature category and in an instance the refined static feature category count satisfies one or more thresholds as given by the one or more refined dynamic feature category counts, the refined static feature category combination corresponding to the refined static feature category count is determined as a refined eligible feature category combination. For example, a refined dynamic feature category combination may be defined by a 2 and 1 refined dynamic feature category count which corresponds to a first feature category and a third feature category, respectively. As such, if the refined static feature category combination includes a refined static feature category count greater than or equal to a 2 for a first feature category and a refined static feature category count greater than or equal to 1 for a third feature category, the refined static feature category combination is selected as a refined eligible feature category combination. Therefore, a refined static feature category combination which includes a 4 and 2 refined static feature category count corresponding to a first feature category and a third feature category, respectively would be selected as a refined eligible feature category combination. However, a refined static feature category combination which includes a 5 and 0 refined static feature category count corresponding to a first feature category and a third feature category, respectively would not be selected as a refined eligible feature category combination as the refined feature category count for the third feature category does not satisfy the refined dynamic feature category count for the third feature category.

The term "conforming feature combination" may refer to an electronically-managed data construct that describes a feature combination which satisfies a particular refined eligible feature category combination. For example, a refined eligible feature category combination may include a 4 and 2 refined feature category count corresponding to a first feature category and a third feature category. A plurality of features may include 5 features corresponding to a first feature category and 2 features corresponding to a third feature category. A first conforming feature combination may include 4 of any of the 5 features corresponding to the first feature category and 2 of the 2 features corresponding to the third feature category. Another conforming feature may similarly include 4 of the 5 features corresponding to the first feature category, where 1 of the 4 features is different than the features from the first conforming feature combination, and 2 of the 2 features corresponding to the third category.

The term "eligible feature combination" may refer to an electronically-managed data construct that describes a conforming feature combination for a refined eligible feature category combination. For example, if there are 5 conforming feature combinations for a first refined eligible feature category combination and 20 conforming feature combinations for a second refined eligible feature category combination, the eligible feature combination may describe the cumulative conforming feature combinations such that the eligible feature combination describes 25 conforming feature combinations. In some embodiments, an eligible feature combination that is associated with an affirmative value for at least one reward feature factor may be excluded from a plurality of eligible feature combinations if the particular eligible feature combination fails to satisfy one or more reward factor criteria. In some embodiments, the reward factor criteria may be based at least in part on a distribution of one or more feature scores and/or target rating scores across one or more other associated service facilities.

The term "aggregate distance measure" may refer to an electronically-managed data construct that describes an aggregated distance measure for an eligible feature combination that is determined based at least in part on at least one of each current distance measure for the eligible feature combination or each historical distance measure for the eligible feature combination. The current distance measure and/or historical distance measure corresponding to each feature in eligible feature combination may be totaled to determine the aggregate distance measure. For example, an eligible feature combination which includes ABA, COL, and MPF features, each corresponding to current distance measures of 5.5, 10, and 7, respectively, may be totaled to determine an aggregate distance measure of 22.5. In some embodiments, a particular eligible feature combination may be associated with a cross-temporal feature category. In an instance the particular eligible feature combination is associated with an affirmative value for the cross-temporal improvement feature category, determination of the aggregate distance measure may be based at least in part on both each current distance measure for the eligible feature combination and the historical distance measure for the eligible feature combination. For example, the eligible feature combination from the prior example, which includes ABA, COL, and MPF features may also each correspond to historical distance measures of 4, 1, and 4, respectively, and as such may be totaled to determine an aggregate distance measure of 9. In an instance the associated cross-temporal improvement feature category has an affirmative value, the aggregated distance as determined using current distance measures for the eligible feature combination and the aggregated distance as determined using historical distance measures for the eligible feature combination may be compared and the maximum aggregated distance may be selected.

The term "refined eligible feature category combination" may refer to an electronically-managed data construct that describes the eligible feature combination which is selected as a preferred feature selection combination based at least in part on aggregated distance measures for a set of eligible feature combinations. In some embodiments, the preferred feature selection combination associated with the lowest aggregated distance measure is determined as the refined eligible feature category combination.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM FRAMEWORK

FIG. 1 is a schematic diagram of an example system architecture 100 for performing data analysis operations related to one or more electronic documents. The system architecture 100 includes a data analysis system 101 comprising a data analysis computing entity 106 configured to determine feature selection based at least in part on both temporally static feature selection criteria and temporally dynamic feature selection criteria. The data analysis system 101 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The system architecture 100 includes a storage subsystem 108 configured to store at least a portion of the data utilized by the data analysis system 101. The data analysis computing entity 106 may be in communication with one or more external computing entities 102. The data analysis computing entity 106 may be configured to receive requests and/or data from external computing entities 102, process the requests and/or data to generate outputs and provide the outputs to the external computing entities 102. The external computing entity 102 may periodically update/provide raw input data (e.g., features, feature categories, feature weights, a target rating score, a current rating score, a current reward factor, etc.) to the data analysis system 101.

The storage subsystem 108 may be configured to store at least a portion of the data utilized by the data analysis computing entity 106 to perform data analysis steps/operations and tasks. The storage subsystem 108 may be configured to store at least a portion of operational data and/or operational configuration data including operational instructions and parameters utilized by the data analysis computing entity 106 to perform prescriptive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The data analysis computing entity 106 includes a data analysis engine 110. The data analysis engine 110 may be configured to perform one or more operations relating to a plurality of features. For example, the data analysis engine 110 may be configured to identify a plurality of features, determine a plurality of statically eligible feature category combinations, determine one or more refined statically eligible feature category combinations, determine a plurality of dynamically eligible feature category combinations, determine one or more refined dynamically eligible feature category combinations, determine one or more refined eligible feature category combinations, determine a plurality of eligible feature combinations, determine an aggregate distance measure for each eligible feature combination, determine a refined featured category combination, and/or provide perform one or more actions based at least in part on the refined eligible feature category combination.

Exemplary Data Analysis Computing Entity

FIG. 2 provides a schematic of a data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the data analysis computing entity 106 may include or be in communication with a processing element 205 (also referred to as processors, processing circuitry, and/or similar terms used herein interchangeably) that communicate with other elements within the data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the data analysis computing entity 106 with the assistance of the processing element 205 and operating system.

As indicated, in one embodiment, the data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the data analysis computing entity 106 may include or be in communication with one or more input elements, such as a keyboard input, a mouse input, a touch screen/display input, motion input, movement input, audio input, pointing device input, joystick input, keypad input, and/or the like. The data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, wearable devices, computing entities, desktops, mobile phones, tablets, notebooks, laptops, keyboards, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the data analysis computing entity 106 and/or various other computing entities.

In another embodiment, the external computing entity 102 may include one or more components or functionality that are the same or similar to those of the data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a video capture device (e.g., camera), a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present invention address technical challenges related to providing feature selection based at least in part on both temporally static feature selection criteria and temporally dynamic feature selection criteria. For example, in some embodiments, proposed solutions disclose identifying a plurality of features and determining a plurality of statically eligible feature category combinations and dynamically eligible feature category combinations. The statically eligible feature category combinations and dynamically eligible feature category combinations may be filtered using one or more static refinement constraints and one or more dynamic refinement constraints, respectively, to determine one or more refine statically eligible feature category combinations and refined dynamically eligible feature category combinations. A plurality of eligible feature combinations may be determined and an aggregate distance measure may be determined for each eligible feature combination. A refined eligible feature category combination may then be determined based at least in part on each aggregate distance measure and one or more actions may be performed based at least in part on the refined eligible feature category combination. In doing so, various embodiments of the present invention address shortcomings of conventional feature selection solutions and enable solutions that are capable of consideration various feature combinations as well as consideration of both temporally static feature selection criteria and temporally dynamic feature selection criteria.

FIG. 4 is a flowchart diagram of an example process 400 for feature selection based at least in part on both temporally static feature selection criteria and temporally dynamic feature selection criteria. Via the various steps/operations of process 400, the data analysis computing entity 106 may determine a plurality of eligible feature combinations that can be improved in order to improve one or more overall rating categories for an entity (e.g., a star rating for a Medicare plan, an improvement star rating for a Medicare plan, and/or the like).

At step/operation 401, the data analysis engine 110 of the data analysis computing entity 106 determines one or more refined statically eligible feature category combinations. In some embodiments, prior to determining the one or more refined statically eligible feature category combinations, the data analysis engine 110 may first identify a plurality of features. The plurality of features may be identified in a variety of ways. In some embodiments, the plurality of features may be stored in an associated memory, such as storage subsystem 108 and identified based at least in part on received user input. In some embodiments, the data analysis engine 110 may receive a request for feature selection from one or more external computing entities 102 and the request for feature selection may include the plurality of features.

A feature may describe a particular metric that is used to determine a rating category for a particular service entity. For example, a feature may be a COL feature which describes a metric indicative of the percentage of eligible members who received a colorectal screening in a given time period. A feature may be associated with a particular feature category of plurality of feature categories. In some embodiments, the feature may correspond to a distance category. The distance category be determined based at least in part on an associated feature score for the feature and one or more distance score thresholds for a feature. In some embodiments, a distance category is defined by one or more distance score thresholds. In some embodiments, each feature category is further associated with a feature category weight of a plurality of feature category weights. By way of continuing example, the first feature category may have an associated feature category weight of 1, the second feature category may have an associated feature category weight of 2, the third feature category may have an associated feature category weight of 3, the fourth feature category may have an associated feature category weight of 4, and the fifth feature category may have an associated feature category weight of 5.

In some embodiments, the plurality of feature categories may include a cross-temporal improvement feature category which comprises a cross-temporal improvement feature. In some embodiments, the plurality of feature categories may include a reward factor feature category. The reward factor feature category may include one or more reward factor features. In some embodiments, a reward factor feature may be associated with a reward value. A reward value may by a value which is appended onto a rating score after a rating score has been determined based at least in part on plurality of feature scores.

An operational example of a current summary of the target rating score and current rating score is depicted in FIG. 5A. As depicted in FIG. 5A, an example target rating score 501 may correspond to a particular rating category which the service entity would like to achieve. The current rating score 502 may similarly correspond to a particular rating category within which the service entity is current associated with. The service entity may also be associated with a current reward factor 503. A reward factor increment 504 may be determined based at least in part on the target rating score and the current rating score. For example, the reward factor increment 504 may be determined as the difference between the target rating score and the current rating score after rounding to the nearest tenth of a decimal. The reward factor increment 504 may be indicative of the reward factor required to achieve the current rating score.

FIG. 5B depicts a plurality of features 505. Each of the plurality of features 505 may be associated with a particular feature category 510, 515, or 520. Each feature category 510, 515, or 520 may be associated with a feature category weight 506 for each of the plurality of features 505. For example, an ABA feature 507 may correspond to a first feature category 510 and be associated with a feature category weight of 1. The feature category 520 may be a cross-temporal improvement feature category that comprises a cross-temporal improvement feature 508.

In some embodiments, each feature may be associated with a current distance measure and a historical distance measure. The current distance measure and historical distance measure associated with each feature will be discussed in greater detail with reference to step/operation 405.

The data analysis engine 110 may determine a plurality of statically eligible feature category combinations. Each statically eligible feature combination may be determined based at least in part on the candidate features and the corresponding feature category. Each statically eligible feature combination may describe a plurality of static feature category counts for the plurality of feature categories. In some embodiments, each statically eligible feature category combination may be associated with a static cumulative weight that satisfies a static cumulative weight threshold. Each static cumulative weight threshold for the statically eligible feature category combination may be determined based at least in part on the plurality of static feature category counts for the particular statically eligible feature category combination and the plurality of feature category weights. Furthermore, each static cumulative weight for a particular statically eligible feature category combination is determined based at least in part on the plurality of static feature category counts for the particular statically eligible feature category combination and the plurality of feature category weights. A statically eligible feature combination may be determined to include all possible statically eligible feature combinations which satisfy a particular static cumulative weight threshold. In some embodiments, the plurality of statically eligible feature combinations may be determined by using the following operations:

$$\min \sum_i n_i x_i \qquad \text{Equation 1}$$

In equation 1, n is defined as the number of feature categories and x is defined as the union between the set of feature category weights and a reward factor weight. Furthermore, equation 1 may be subjected to the following constraints:

$$\sum_i n_i x_i \geq D \qquad \text{Equation 2}$$

In equation 2, D is the static cumulative weight threshold. A statically eligible feature combination may be determined for feature combinations which satisfy both equations 1 and 2.

For example, a particular statically eligible feature category combination may be characterized by a static feature category count of 4 and 2 for a first feature category and a third feature category and a static feature category count of 0 for other feature categories, which would indicate that the statically eligible feature category combination covers all feature combinations that include four features having the first feature category, two features having the third feature category, and no features from other feature categories. In the noted example, if the first feature category is associated with a feature category weight of one and the third feature category is associated with a feature category weight of three, the statically eligible feature category combination may be associated with a static cumulative weight threshold of 4*1+2*3=10. The cumulative static weight for the statically eligible feature category combination may be determined based at least in part on the plurality of static feature category counts and the plurality of feature category weights. Since the statically eligible feature category combination is characterized by a static feature category count of 4 and 2 for a first feature category, and further since a third feature category and the first feature category has a feature category weight of 1 and the third feature category has a feature category weight of 3, the static cumulative weight for the statically eligible feature category combination may be 10. In the noted example, the feature category combination may be deemed to be statically eligible if the cumulative weight threshold is defined such that each feature category combination is deemed statically eligible if the cumulative weight threshold for the feature category combination is 10.

An operational example of a plurality of statically eligible feature category combinations 600 is depicted in FIG. 6. As depicted in FIG. 6, the plurality of statically eligible feature category combinations 600 may include statically eligible feature category combinations 601 and 606-608. Each statically eligible feature category combination 601 and 606-608 may be characterized by a plurality of static feature category counts (e.g., the static feature category counts 610-613 for the statically eligible feature combination 606) with respect to the plurality of feature categories 602-605.

Each statically eligible feature category combination 601 and 606 may be associated with a static cumulative weight that satisfies a static cumulative weight threshold. The statically cumulative weight threshold may be determined by the data analysis engine 110. For example, a statically cumulative weight threshold D may be determined using the following equation:

$$D = \text{ceiling}\left(\frac{r - (s + f)}{\sum_i w_i}\right) \qquad \text{Equation 3}$$

In Equation 3, the cumulative weight threshold D is determined based at least in part on the target rating score r, the current rating score s, the current reward factor f, and the sum of all feature category weights for each feature of the plurality of features. Using the current summary and plurality of features described in the operational examples of FIGS. 5A-B, a statically cumulative weight threshold may be determined such that a cumulative weight threshold D value of 10 is determined. Further, the static cumulative weight for a statically eligible feature category combination 601 and 606 may be determined based at least in part on the plurality of static feature category counts for the plurality of feature categories and the feature category weight associated with the plurality of feature categories. For example, the statically eligible feature category combination 601 has a static feature category count of 10 corresponding to a first feature category 602 and a static feature category count of 0 corresponding to a second feature category 603, wherein the first feature category 602 corresponds to a feature category weight of 1. As such the statically eligible feature category combination 601 has a static cumulative weight of 10, which satisfies the static cumulative weight threshold D of 10. As another example, the statically eligible feature category combination 606 has a static feature category count of 7 corresponding to a first feature category 602 and a static feature category count of 1 corresponding to a second feature category 603, wherein the first feature category 602 corresponds to a feature category weight of 1 and the second feature category 603 corresponds to a feature category weight of 3. As such the statically eligible feature category combination 606 has a static cumulative weight of 10, which also satisfies the cumulative weight threshold D of 10.

In FIG. 6, the feature category 604 may correspond to a cross-temporal improvement feature category. The cross-temporal improvement feature category may also be associated with a static feature category count and may correspond to a feature weight of 5. The cross-temporal static feature category may be included to determine the static cumulative weight of a statically eligible feature category combination. For example, the statically eligible feature category combination 607 has a static feature category count of 5 corresponding to a first feature category 602 and a static feature category count of 1 corresponding to a cross-temporal feature category 604, wherein the first feature category 602 corresponds to a feature category weight of 1 and the cross-temporal feature category 604 corresponds to a feature category weight of 5. As such the statically eligible feature category combination 607 has a static cumulative weight of 10, which also satisfies the cumulative weight threshold D of 10.

In some embodiments, the data analysis engine 110 may also determine a reward factor feature set F. In some embodiments, the data analysis engine 110 may determine the reward factor feature set F using the following equation:

$$F = \text{ceiling}\left(\frac{10(f + x_0)}{\sum_i w_i}\right) \quad \text{Equation 4}$$

In equation 4, f is current reward factor and $x_0$ is a reward factor increment value. In some embodiments, feature categories which correspond to a reward factor feature category may have a static feature category count based at least in part on the rewards factor feature set. For example, feature category 605 may correspond to a reward factor feature category and the factor feature set F may include a single reward factor value of 10. As such, the reward factor feature category 605 corresponding to the reward factor feature category may have an associated feature category weight of 10. Therefore, the statically eligible feature category combination 608, which includes a static feature category count of 1 corresponding to reward factor feature category 605 has a cumulative weight of 10, which satisfies the cumulative weight threshold of 10.

The data analysis engine 110 may determine one or more refined statically eligible feature category combinations by filtering the plurality of statically eligible feature category combinations based at least in part on one or more static refinement constraints. A static refinement constraint may define an allowed range (e.g., an upper bound value) for a particular statically eligible feature category count of refined statically eligible feature category combination, such as if the particular statically eligible feature category count of a particular statically eligible feature category combination is not within the allowed range, the particular statically eligible feature category combination is not determined to be a refined statically eligible feature category combination. For example, a first feature category may include 5 features and thus, a static refinement constraint of 5 may apply to the static feature category corresponding to the first feature category. In some embodiments, the one or more static confinement constraints comprise a static count threshold for each feature category.

An operational example of one or more refined statically eligible feature category combinations is depicted in FIG. 7. Each refined statically eligible feature category combination 701 and 706 may be characterized by a plurality of static feature category counts for the plurality of feature categories 702-705. Each refined statically eligible feature category combination 701 and 706 may correspond to a particular statically eligible feature category combination from the plurality of statically eligible feature category combination as depicted in FIG. 6.

The plurality of statically eligible feature category combination as depicted in FIG. 6 may be filtered based at least in part on one or more static refinement constraints. The one or more static confinement constraints may be determined by the data analysis engine 110 based at least in part on the plurality of features and corresponding feature categories as depicted in FIG. 5B. For example, the first feature category 510 may only be allowed to include 5 features and the second feature category 515 may include 2 features. As such, the one or more static refinement constraints may constrain the static feature category count for the first feature category to include only statically eligible feature category combinations with a static feature category count of 5 or less for the first feature category. Similarly, the one or more static refinement constraints may constrain the static feature category count for the second feature category to include only statically eligible feature category combinations with a static feature category count of 2 or less for the second feature category. In some embodiments, feature categories which correspond to a cross-temporal improvement feature category and/or reward factor feature category are not included to determine the one or more static refinement constraints.

The data analysis engine 110 may then filter the plurality of statically eligible feature category combinations of FIG. 6 based at least in part on the one or more static refinement constraints. For example, the statically eligible feature category combination 606 may be filtered out such that it is not included as a refined statically eligible feature category combination as the static feature category count 610 corresponding to the first feature category 602 exceeds the static refinement constraint that constrains the first feature category 602 to a feature category count of 5 or less. As another example, the statically eligible feature category combination 607 may be included as a refined statically eligible feature category combination 706 as the static feature category count 612 corresponding to the first feature category 602 satisfies the static refinement constraint that constrains the first feature category 602 to a feature category count of 5 or less and the static feature category count 613 corresponding to the second feature category 603 satisfies the static refinement constraint that constrains the second feature category 603 to a feature category count of 2 or less.

At step/operation 402, the data analysis engine 110 of the data analysis computing entity 106 determines one or more refined dynamically eligible feature category combinations. In some embodiments, prior to determining the one or more refined dynamically eligible feature category combinations, the data analysis engine 110 may first determine whether each feature is deemed to be features that affect a cross-temporal improvement rating. In some embodiments, the data analysis engine 110 may not evaluate features associated with a cross-temporal improvement feature category and/or a reward factor feature category for eligibility improvement as those features are not deemed to be features that affect a cross-temporal improvement rating (aka. as features that are not deemed eligible for improvement). In some embodiments, a feature is be deemed to not affect a cross-temporal improvement rating if the feature is not associated with a feature score which corresponds to a maximum feature score category.

FIG. 8 depicts an operational example of a plurality of features 802 and the associated eligibility determinations 804 for each feature. Each of the plurality of features 802 may be associated with a particular feature category 810 and 815. Each feature category 810 and 815 may be associated with a feature category weight 803 for each of the plurality of features 802. For example, an ABA feature 801 may correspond to a first feature category 810 and be associated with a feature category weight of 1. Each feature may also be associated with an eligibility determination 804, indicative of whether the feature is eligible for improvement. For example, the ABA feature 801 with an eligibility determination of 1 may be eligible for improvement. As another example, the COL feature 806 with an eligibility determination of 0 may not be eligible for improvement.

The data analysis engine 110 may determine a plurality of dynamically eligible feature category combinations. Each dynamically eligible feature combination may describe a plurality of dynamic feature category counts for the plurality of feature categories. In some embodiments, each dynamically eligible feature category combination may be associated with a dynamic cumulative weight that satisfies a dynamic cumulative weight threshold. Each dynamic cumulative weight threshold for the dynamically eligible feature category combination may be determined based at least in part on the plurality of dynamic feature category counts for the particular dynamically eligible feature category combination and the plurality of feature category weights. In some embodiments, the dynamic cumulative weight threshold may be further determined based at least in part on the eligibility determination for the plurality of features. Furthermore, each dynamically cumulative weight for a particular dynamically eligible feature category combination is determined based at least in part on the plurality of dynamic feature category counts for the particular dynamically eligible feature category combination and the plurality of feature category weights. A dynamically eligible feature combination may be determined to include all possible dynamically eligible feature combinations which satisfy a particular dynamic cumulative weight threshold. In some embodiments, the plurality of dynamically eligible feature combinations may be determined by using the following operations:

$$\min \sum_i n_i \hat{w}_i \qquad \text{Equation 5}$$

In equation 5, n is defined as the number of feature categories and $\hat{w}$ is defined as the set of feature category weights. Furthermore, equation 5 may be subjected to the following constraints:

$$\sum_i n_i \hat{x}_i \geq \hat{D} \qquad \text{Equation 6}$$

In equation 6, $\hat{D}$ is the dynamically cumulative weight threshold. A dynamically eligible feature combination may be determined for feature combinations which satisfy both equations 5 and 6.

For example, a particular dynamically eligible feature category combination may be characterized by a dynamic feature category count of 2 and 1 for a first feature category and a third feature category and a dynamically feature category count of 0 for other feature categories. The dynamically eligible feature category combination may be associated with a dynamic cumulative weight threshold of 5. The cumulative dynamic weight for the dynamically eligible feature category combination may be determined based at least in part on the plurality of dynamic feature category counts and the plurality of feature category weights. Since the dynamically eligible feature category combination is characterized by a dynamic feature category count of 2 and 1 for a first feature category and a third feature category, and further since the first feature category has a feature category weight of 1 and the third feature category has a feature category weight of 3, the dynamic cumulative weight for the dynamically eligible feature category combination may be 5. The dynamically cumulative weight of 5 may satisfy the dynamic cumulative weight threshold if the dynamically cumulative weight equals 5.

An operational example of a plurality of dynamically eligible feature category combinations is depicted in FIG. 9. As depicted in FIG. 9, a plurality of dynamically eligible feature category combinations 900 may include a plurality of dynamically eligible feature category combinations 901 and 904. Each dynamically eligible feature category combination 901 and 904 may be characterized by a plurality of dynamic feature category counts 905-908 for the plurality of feature categories 902-903.

Each dynamically eligible feature category combination 901 and 904 may be associated with a dynamic cumulative weight that satisfies a dynamic cumulative weight threshold. The dynamically cumulative weight threshold may be determined by the data analysis engine 110. For example, a dynamically cumulative weight threshold $\hat{D}$ may be determined using the following equation:

$$\hat{D} = \text{ceiling}\left(\frac{c-s}{1/\sum_i w_i}\right) \qquad \text{Equation 7}$$

In Equation 7, the cumulative weight threshold $\hat{D}$ is determined based at least in part on target score threshold c for the next target rating category, a current improvement rate s, and the sum of all feature category weights for each feature of the plurality of features. Using the plurality of features described in the operational examples of FIG. 8 and given a target score threshold c of 0.86 and a current improvement rates of 0.40833, a dynamically cumulative weight threshold may be determined such that a cumulative weight threshold $\hat{D}$ value of 5 is determined. Further, the dynamic cumulative weight for a dynamically eligible feature category combination 901 and 904 may be determined based at least in part on the plurality of dynamic feature category counts 905-908 for the plurality of feature categories and the feature category weight associated with the plurality of feature categories. For example, the dynamically eligible feature category combination 901 has a dynamic feature category count of 5 corresponding to a first feature category 902 and a dynamic feature category count of 0 corresponding to a second feature category 903, wherein the first feature category 902 corresponds to a feature category weight of 1. As such the dynamically eligible feature category combination 901 has a dynamic cumulative weight of 5, which satisfies the dynamic cumulative weight threshold $\hat{D}$ of 5. As another example, the dynamically eligible feature category combination 904 has a dynamic feature category count of 2 corresponding to a first feature category 902 and a dynamic feature category count of 1 corresponding to a second feature category 903, wherein the first feature category 902 corresponds to a feature category weight of 1 and the second feature category 903 corresponds to a feature category weight of 3. As such the dynamically eligible feature category combination 906 has a dynamic cumulative weight of 5, which also satisfies the cumulative weight threshold $\hat{D}$ of 5.

The data analysis engine 110 may determine one or more refined dynamically eligible feature category combinations by filtering the plurality of dynamically eligible feature category combinations based at least in part on one or more dynamic refinement constraints. A dynamic refinement constraint may define an allowed range (e.g., an upper bound value) for a particular dynamically eligible feature category count of a refined dynamically eligible feature category combination, such that if the particular dynamically eligible feature category count of a dynamically eligible feature category combination is not in the allowed range, the particular dynamically eligible feature category combination is not deemed to be a refined dynamically eligible feature category combination. For example, a first feature category may include 5 features, and, thus, a static refinement constraint of 5 may apply to the dynamic feature category corresponding to the first feature category.

An operational example of one or more refined dynamically eligible feature category combinations is depicted in FIG. 10. Each refined dynamically eligible feature category combination 1001 may be characterized by a plurality of dynamic feature category counts for the plurality of feature categories 1002-1003. Each refined dynamically eligible feature category combination 1001 may correspond to a particular dynamically eligible feature category combination from the plurality of dynamically eligible feature category combination as depicted in FIG. 9.

The plurality of dynamically eligible feature category combination as depicted in FIG. 9 may be filtered based at least in part on one or more dynamic refinement constraints. The one or more dynamic confinement constraints may be determined by the data analysis engine 110 based at least in part on the plurality of features and corresponding feature categories as depicted in FIG. 8. For example, the first feature category 810 may include 4 features and the second feature category 815 may include 2 features. However, only 3 of the features of the 4 features in the first feature category 810 may be associated with an affirmative eligibility determination. As such, a dynamic confinement constraint value of 3 may be associated with the first feature category. Similarly, only 1 of the feature of the 2 features in the second feature category 815 may be associated with an affirmative eligibility determination. As such a dynamic confinement constraint value of 1 may be associated with the second feature category.

In some embodiments, the one or more dynamic refinement constraints may constrain the dynamic feature category count for the first feature category to include only dynamically eligible feature category combinations with a dynamic feature category count of 3 or less in the first feature category. Similarly, the one or more dynamic refinement constraints may constrain the dynamic feature category count for the second feature category to include only dynamically eligible feature category combinations with a dynamic feature category count of 1 or less in the second feature category.

The data analysis engine 110 may then filter the plurality of dynamically eligible feature category combinations of FIG. 9 based at least in part on the one or more dynamic refinement constraints. For example, the dynamically eligible feature category combination 901 may be filtered out such that it is not included as a refined dynamically eligible feature category combination if the dynamic feature category count 905 corresponding to the first feature category 902 exceeds the dynamic refinement constraint that constrains the first feature category 902 to a feature category count of 3 or less. As another example, the dynamically eligible feature category combination 904 may be included as a refined dynamically eligible feature category combination 1001 if the dynamic feature category count 907 corresponding to the first feature category 902 satisfies the dynamic refinement constraint that constrains the first feature category 902 to a feature category count of 3 or less and the dynamic feature category count 908 corresponding to the second feature category 903 satisfies the dynamic refinement constraint that constrains the second feature category 903 to a feature category count of 1 or less.

At step/operation 403, the data analysis engine 110 of the data analysis computing entity 106 determines one or more refined eligible feature category combinations. A refined eligible category combination may describe one or more refined static feature category counts for the plurality of feature categories after filtering based at least in part on one or more refined dynamically eligible feature category combinations. In some embodiments, one or more refined static feature category counts each corresponding to a particular feature category are compared to one or more refined dynamic feature category counts, each corresponding to the same feature category, and in an instance the refined static feature category count satisfies one or more thresholds as given by the one or more refined dynamic feature category counts, the refined static feature category combination corresponding to the refined static feature category count is determined as a refined eligible feature category combination. For example, a refined dynamic feature category combination may be defined by 2 and 1 refined dynamic feature category counts for a first feature category and a third feature category, respectively. As such, if the refined static feature category combination includes a refined static feature category count greater than or equal to a 2 for a first feature category and a refined static feature category count greater than or equal to 1 for a third feature category, the refined static feature category combination is selected as a refined eligible feature category combination. Therefore, a refined static feature category combination which includes 4 and 2 refined static feature category counts corresponding to a first feature category and a third feature category respectively would be selected as a refined eligible feature category combination. However, a refined static feature category combination which includes 5 and 0 refined static feature category counts corresponding to a first feature category and a third feature category respectively would not be selected as a refined eligible feature category combination as the refined feature category count for the third feature category does not satisfy the refined dynamic feature category count for the third feature category.

Operational examples of one or more refined eligible feature category combinations are depicted in FIGS. 11-12. As depicted in FIG. 11, the one or more refined statically eligible feature category combinations 1101 are filtered based at least in part on the one or more refined dynamically eligible feature category combinations 1102. Each refined statically eligible feature category combinations 1101 may be characterized by one or more refined static feature category counts, each of which corresponds to a particular feature category 1103-1104 and 1120-1121. Similarly, each refined dynamically eligible feature category combinations 1102 may be characterized by one or more refined dynamic feature category counts, each of corresponds to a particular feature category 1105-1106. The feature categories 1103 and 1105 may each correspond to a first feature category with a feature category weight of 1. Similarly, the feature categories 1104 and 1106 may each correspond to a second feature category with a feature category weight of 3. The dynamic feature category count for each of the one or more refined dynamically eligible feature category combinations 1102 may be used to filter the one or more refined statically eligible feature category combinations 1101 to determine one or more refined eligible feature category combinations 1200 as depicted in FIG. 12.

For example, the dynamic feature category count 1111 associated with the feature category 1105, corresponding to a first feature category with a feature category weight of 1, may be used to filter the refined statically eligible feature category combinations 1101 in the feature category 1103 which also correspond to the first feature category with a feature category weight of 1. Similarly, the dynamic feature category count 1112 associated with feature category 1106, corresponding to a second feature category with a feature category weight of 3, may be used to filter the refined statically eligible feature category combinations 1101 in the feature category 1104 which also correspond to the second feature category with a feature category weight of 3.

In the given example of FIG. 11, the dynamic feature category count 1111 may have a value of 2 and the dynamic feature category count 1112 may have a value of 1. As such, a static feature count for a particular refined statically eligible feature category combination may be required to be greater than or equal to a value of 2 in the first feature category and 1 in the second feature category. For example, a refined statically eligible feature category combination 1101a may not be filtered out of the one or more refined eligible feature category combinations because the static feature category count 1107 with a value of 4 associated with the first feature category 1103 is greater than or equal to the dynamic feature category count 1111 with a value of 2 associated with the first feature category 1105 and the static feature category count 1108 with a value of 2 associated with the second feature category 1104 is greater than or equal to the dynamic feature category count 1112 with a value of 1 associated with the second feature category 1106. As such, the refined statically eligible feature category combination 1101a may be included in the one or more refined eligible feature category combinations 1200 as a refined eligible feature category combination 1201. As another example, a refined statically eligible feature category combination 1101b may be filtered out such that it is not included among the one or more refined eligible feature category combinations because the static feature category count 1110 with a value of 0 associated with the second feature category 1104 is not greater than or equal to the dynamic feature category count 1112 with a value of 1 associated with the second feature category 1106.

The resulting one or more refined eligible feature category combinations 1200 may include the one or more refined statically eligible feature category combinations that survive filtering operations described above. Furthermore, the refined eligible feature category combination may be associated with feature categories 1202-1205 which may be the same as the features category for the plurality of refined statically eligible feature category combinations.

At step/operation 404, the data analysis engine 110 of the data analysis computing entity 106 determines a plurality of eligible feature combinations. In some embodiments, the data analysis engine 110 may determine a plurality of conforming feature combinations for each refined eligible category combination. The plurality of eligible feature combinations may then include the plurality of conforming feature combinations for each refined eligible category combination.

A conforming feature combination may describe a feature combination which satisfies a particular refined eligible feature category combination. For example, a refined eligible feature category combination may include a 4 and 2 refined feature category count corresponding to a first feature category and a third feature category. A plurality of features may include 5 features corresponding to a first feature category and 2 features corresponding to a third feature category. A first conforming feature combination may include 4 of any of the 5 features corresponding to the first feature category and 2 of the 2 features corresponding to the third feature category. Another conforming feature may similarly include 4 of the 5 features corresponding to the first feature category, where 1 of the 4 features is different than the features from the first conforming feature combination, and 2 of the 2 features corresponding to the third category.

Operational examples of a plurality of conforming feature combinations are depicted in FIGS. 13-14. FIG. 13 depicts a plurality of conforming feature combinations which corresponds to refined eligible feature category combination 1201 as depicted in FIG. 12. The refined eligible feature category combination 1201 as depicted in FIG. 12 is characterized in part by a static feature category count values of 4 and 2, which correspond to a first feature category 1202 with an associated feature category weight of 1 and a second feature category 1203 with an associated feature category weight of 3. As such, the plurality of conforming feature combinations 1300 may include 4 conforming feature categories 1302-1305 corresponding to features associated with a first feature category and 2 conforming feature categories 1306-1307 corresponding to features associated with a second feature category.

Referring back now to the plurality of features as depicted in FIG. 5B, the first feature category 510 includes 5 features and the second feature category 515 includes 2 features. As such, the plurality of conforming feature combinations 1300 may include all unique combinations of 4 features corresponding to the first feature category and 2 features corresponding to the second feature category. For example, conforming feature combination 1301 may include the features ABA, COL, GCQ, and FLU which correspond to the first feature category and the features MPF and CBP which correspond to the second feature category. As another example, conforming feature combination 1308 may include the features MAD, COL, GCQ, and FLU which correspond to the first feature category 510 and the features MPF and CBP which correspond to the second feature category 515. The difference between conforming feature combination 1308 and 1301 may be the inclusion of the MAD feature rather than the ABA feature.

Similarly, FIG. 14 depicts a plurality of conforming feature combinations which corresponds to refined eligible feature category combination 1206 as depicted in FIG. 12. The refined eligible feature category combination 1201 as depicted in FIG. 12 is characterized in part by a static feature category count values of 2 and 1, which correspond to a first feature category 1202 with an associated feature category weight of 1 and a second feature category 1203 with an associated feature category weight of 3. As such, the plurality of conforming feature combinations 1400 may include 2 conforming feature categories 1402-1403 corresponding to features associated with a first feature category and 1 conforming feature category 1404 corresponding to features associated with a second feature category. As such, the plurality of conforming feature combinations 1400 may include all unique combinations of 2 features corresponding to the first feature category and 1 feature corresponding to the second feature category. For example, conforming feature combination 1401 may include the features ABA and COL which correspond to the first feature category 510 and the feature MPF which corresponds to the second feature category 515. As another example, conforming feature combination 1405 may include the features ABA and GCQ which correspond to the first feature category and the feature MPF which correspond to the second feature category. The difference between conforming feature combination 1405 and 1401 may be the inclusion of the GCQ feature rather than the COL feature.

At step/operation 405, the data analysis engine 110 of the data analysis computing entity 106 determines a current distance measure and a historical distance measure for each feature. In some embodiments, each feature may be associated with a current distance measure and a historical distance measure. The current distance measure may be indicative of a relationship between a current feature score and a particular distance score threshold corresponding to the nearest distance category. For example, a current distance measure may be determined for the COL feature, which has an associated feature score of 70, which corresponds to a second feature category with an associated feature category weight of 2. The COL feature may define a first distance category, second distance category, third distance category, fourth distance category, and fifth distance category, where the first distance category corresponds to feature scores between 0 and 20, the second distance category corresponds to feature scores between 21 and 40, the third distance category corresponds to feature scores between 41 and 60, the fourth distance category corresponds to feature scores between 61 and 80, and the fifth distance category corresponds to feature scores between 81 and 100. As such, the COL feature may correspond to a fourth distance category and the nearest distance category may be the fifth distance category, which is defined by a lower bounds of 81. As such, the current distance measure may be determined based at least in part on the difference between the current feature score of 60 and the distance score threshold of 81 for the nearest distance category, such that the current distance measure is 11. The historical distance measure may be indicative of a relationship between a particular feature score associated with a historical time frame (e.g., a feature score associated with a prior year) and to the nearest distance category. By way of continuing example, the COL feature may have a historical feature score of 55 corresponding to a third distance category and the nearest distance category may have an associated distance score threshold of 61. The historical distance measure may be indicative of a relationship between a particular feature score associated with a historical time frame (e.g., a feature score associated with a prior year) and to the nearest distance category. By way of continuing example, the COL feature may have a historical feature score of 55 and the nearest distance category may have an associated distance score threshold of 63. The historical feature score may then be solved using the below equation:

$$0 = \frac{\delta_i - \hat{r}_2}{\sqrt{\frac{\delta_i(100-\delta_i)}{den_x} - SE^2 - 2\rho SE \frac{\delta_i(100-\delta_i)}{den_x}}} - 1.96 \qquad \text{Equation 8}$$

In Equation 8, $\delta_i$ may be the historical distance measure, $\hat{r}_2$ may be the historical feature score, $den_x$ may be the current year denominator representative of the number of members evaluated for the particular year for the particular feature, SE is a year-on-year measure correlation as defined by SE and is defined by the rating entity, and $\rho$ is the prior year standard error where may be defined by the equation $$\rho = \sqrt{\frac{\text{historical feature score} * (100 - \text{historical feature score})}{\text{historical feature score denominator}}}.$$

The above equation may be solved for $\delta_i$ using a Newton-Rhapson method. The current distance measure and historical distance measure may be determined for each feature of the plurality of features.

An operational example of a current distance measure and historical distance measure for the plurality of features is depicted in FIG. 15. For each feature 1502, a current distance measure 1503 and a historical distance measure 1504 are determined. For example, the data analysis engine may determine an ABA feature 1506 has a current distance measure value of 5.5 and a historical distance measure of 4.

At step/operation 406, the data analysis engine 110 of the data analysis computing entity 106 determines an aggregate distance measure for each eligible feature combination. An aggregate distance measure value for an eligible feature combination may be determined based at least in part on at least one of each current distance measure for the eligible feature combination or each historical distance measure for the eligible feature combination. The current distance measure and/or historical distance measure corresponding to each feature in eligible feature combination may be aggregated and/or combined to determine the aggregate distance measure. For example, an eligible feature combination which includes ABA, COL, and MPF features, each corresponding to current distance measures of 5.5, 10, and 7, respectively, may be aggregated and/or combined to determine an aggregate distance measure of 22.5.

Figure 16A:
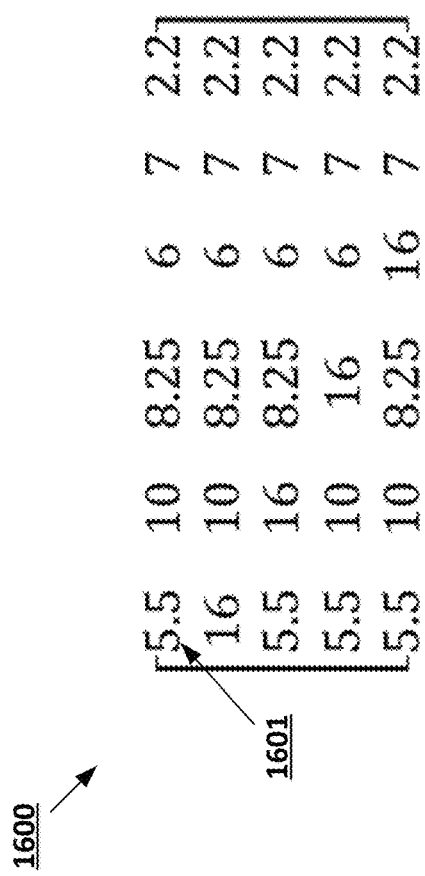
Figure 16B:
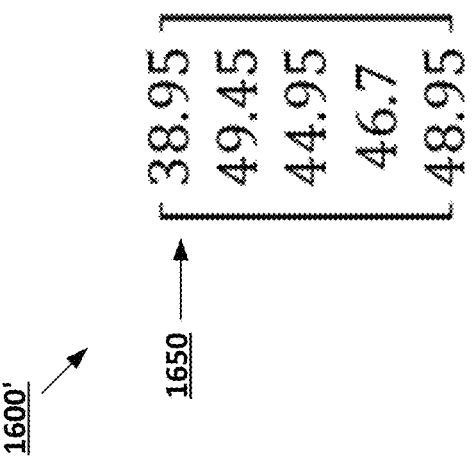

An operational example of an aggregated distance measure for a plurality of conforming feature combinations is depicted in FIG. 16A-B. FIG. 16A depicts the plurality of current distance measures 1600 corresponding to the plurality of conforming feature combinations depicted in FIG. 13. Each current distance measure in the plurality of distance measures corresponds to a particular feature. For example, referring back to FIG. 13, the feature 1310 corresponds to an ABA feature, which has a current distance measure of 5.5 as indicated in FIG. 15. As such, the current feature measure 1601 corresponding to the ABA feature 1310 has a value of 5.5.

As depicted in FIG. 16B, the plurality of aggregated distance measures 1600' are depicted. Each aggregated distance measure may be based at least in part on the current distance measures and/or historical distance measures for the corresponding eligible feature combination. For example, the aggregated distance measure 1650 may be the sum of the current distance measures corresponding to the conforming eligible feature combination 1301 which is an eligible feature combination.

In some embodiments, a particular eligible feature combination may be associated with a cross-temporal feature category. In an instance where the particular eligible feature combination is associated with an affirmative value for the cross-temporal improvement feature category, determination of the aggregate distance measure may be based at least in part on both each current distance measure for the eligible feature combination and the historical distance measure for the eligible feature combination. For example, the eligible feature combination from the prior example, which includes ABA, COL, and MPF features may also each correspond to historical distance measures of 4, 1, and 4, respectively, and as such may be totaled to determine an aggregate distance measure of 9. In an instance where the associated cross-temporal improvement feature category has an affirmative value, the aggregated distance as determined using current distance measures for the eligible feature combination and the aggregated distance as determined using historical distance measures for the eligible feature combination may be compared and the maximum aggregated distance may be selected.

An operational example of an aggregated distance measure for a plurality of conforming feature combinations is depicted in FIGS. 17A-B and 18A-B. FIG. 17A depicts the plurality of current distance measures 1700 corresponding to the plurality of conforming feature combinations depicted in FIG. 14. Each current distance measure in the plurality of distance measures corresponds to a particular feature. For example, referring back to FIG. 14, the feature 1410 corresponds to an ABA feature, which has a current distance measure of 5.5 as indicated in FIG. 15. As such, the current feature measure corresponding to the ABA feature 1410 has a value of 5.5.

As depicted in FIG. 17B, the plurality of aggregated distance measures 1700' are depicted. Each aggregated distance measure may be determined based at least in part on the current distance measures and/or historical distance measures for the corresponding eligible feature combination. For example, the aggregated distance measure 1750 may be the sum of the current distance measures corresponding to the eligible feature combination 1701.

Furthermore, since the plurality of conforming feature combinations 1400 is associated with the refined eligible feature category combination 1206 and the refined eligible feature category combination 1206 has an affirmative value for the cross-temporal improvement feature category 1204, the data analysis engine 110 may determine aggregated distance measure scores based at least in part on the current distance measures and historical distance measures for the features.

FIG. 18A depicts the plurality of historical distance measures 1800 corresponding to the plurality of conforming feature combinations depicted in FIG. 18. Each historical distance measure in the plurality of distance measures corresponds to a particular feature. For example, referring back to FIG. 14, the feature 1410 corresponds to an ABA feature, which has a historical distance measure of 4 as indicated in FIG. 15. As such, the historical feature measure corresponding to the ABA feature 1410 has a value of 4.

As depicted in FIG. 18B, the plurality of aggregated distance measures 1800' is depicted. Each aggregated distance measure may be determined based at least in part on the historical distance measures for the corresponding eligible feature combination. For example, the aggregated distance measure 1850 may be the sum of the historical distance measures corresponding to the eligible feature combination 1801.

The data analysis engine 110 may then select the plurality of aggregated distance measures 1700' and/or 1800' based at least in part on the aggregated distance measures. For example, the data analysis engine 110 may select the maximum aggregated distance measure as determined by either the current distance measure or the historical distance measure.

At step/operation 407, the data analysis engine 110 of the data analysis computing entity 106 determines a refined eligible feature category combination. In some embodiments, the data analysis engine 110 may determine a refined eligible feature category combination based at least in part on the aggregated distance measure associated with each feature category combination. In some embodiments, the data analysis engine 110 may select the feature category combination associated with the lowest aggregated distance measure.

In some embodiments, the data analysis engine 110 may filter eligible feature combinations based at least in part on a feature category count within a feature category corresponding to a reward factor feature category. If an eligible feature combination is associated with an eligible feature category combination with an affirmative value in a reward factor feature category, the eligible feature combination may be associated with an affirmative value for at least one reward feature factor. In some embodiments, an eligible feature combination that is associated with an affirmative value for at least one reward feature factor may be excluded from a plurality of eligible feature combinations if the particular eligible feature combination fails to satisfy one or more reward factor criteria. In some embodiments, the reward factor criteria may be determined based at least in part on a distribution of one or more feature scores and/or target rating scores across one or more other associated service facilities.

At step/operation 408, the data analysis engine 110 of the data analysis computing entity 106 performs one or more actions. The data analysis computing entity 106 may perform one or more actions based at least in part on the refined eligible feature category combination. In some embodiments, the data analysis computing entity 106 may generate a recommended feature combination data object and provide the recommended feature combination data object to one or more external computing entities 102. The recommended feature combination data object may indicate to one or more end users a feature selection. In some embodiments, the recommended feature combination data object may further include a graphical representation of the aggregated distance measures for the plurality of eligible feature combinations.

An operational example of a recommended feature combination data object 1900 is depicted in FIG. 19. The recommended feature combination data object 1900 may include a feature selection 1902. The feature selection 1902 may indicate the determined refined category combination and the one or more features associated with the refined category combination. The recommended feature combination data object 1900 may also include a graphical representation of the aggregated distance measures for the plurality of eligible feature combinations 1901. In some embodiments, the graphical representation is interactable such an end user may scroll over a particular eligible feature combination to view the features within the eligible feature combination.

Other examples of actions include automatic scheduling of appointments based on prescriptive outputs determined based on the refined eligible feature category combination, automatic scheduling of corrective actions with respect to the refined eligible feature category combination, automatic load balancing operations based on prescriptive outputs determined based on the refined eligible feature category combination, and/or the like.

Accordingly, using the above-described techniques, various embodiments of the present invention address technical challenges related to feature selection based at least in part on both temporally static feature selection criteria and temporally dynamic feature selection criteria. For example, in some embodiments, proposed solutions selection identify a plurality of features each associated with a feature category weight, a current distance measure, and historical distance measure and determine a plurality of statically eligible feature category combinations as well as a plurality of dynamically eligible feature combinations of the plurality of features. As another example, various embodiments of the present invention reduce the statically eligible feature category combinations as well as a plurality of dynamically eligible feature combinations by filtering for the eligible feature combinations that satisfy one or more static refinement constraints or dynamic refinement constraints, respectively. As yet another example, various embodiments of the present invention determine a plurality of eligible feature combinations and determine an aggregate distance measure for each eligible feature combination. A refined eligible feature category combination may be determined based at least in part on each aggregate distance measure and one or more action may be performed based at least in part on the refined eligible feature category combination. In doing so, various embodiments of the present invention provide for accurate and efficient feature selection to determine an efficient feature combination to achieve a target rating score by considering both temporally static feature selection criteria and temporally dynamic static feature selection criteria, which allows for more accurate and efficient feature selection.

As described above, various embodiments of the present invention address technical challenges related to providing feature selection based at least in part on both temporally static feature selection criteria and temporally dynamic feature selection criteria. For example, in some embodiments, proposed solutions disclose identifying a plurality of features and determining a plurality of statically eligible feature category combinations and dynamically eligible feature category combinations. The statically eligible feature category combinations and dynamically eligible feature category combinations may be filtered using one or more static refinement constraints and one or more dynamic refinement constraints, respectively, to determine one or more refine statically eligible feature category combinations and refined dynamically eligible feature category combinations. A plurality of eligible feature combinations may be determined and an aggregate distance measure may be determined for each eligible feature combination. A refined eligible feature category combination may then be determined based at least in part on each aggregate distance measure and one or more actions may be performed based at least in part on the refined eligible feature category combination. In doing so, various embodiments of the present invention address shortcomings of conventional feature selection solutions and enable solutions that are capable of consideration various feature combinations as well as consideration of both temporally static feature selection criteria and temporally dynamic feature selection criteria

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A computer-implemented method for feature selection based at least in part on both temporally static feature selection criteria and temporally dynamic feature selection criteria, the computer-implemented method comprising:
   identifying a plurality of features, wherein: (i) each feature of the plurality of features is associated with a feature category of a plurality of feature categories, (ii) each feature category of the plurality of feature categories is associated with a feature category weight of a plurality of feature category weights, and (iii) each feature of the plurality of features is associated with a current distance measure and a historical distance measure;
   determining a plurality of statically eligible feature category combinations, wherein: (i) each statically eligible feature category combination of the plurality of statically eligible feature category combinations is characterized by a plurality of static feature category counts for the plurality of feature categories, (ii) each statically eligible feature category combination of the plurality of statically eligible feature category combinations is associated with a static cumulative weight of one or more static cumulative weights that satisfies a static cumulative weight threshold, and (iii) each static cumulative weight of the one or more corresponding static cumulative weights for a particular statically eligible feature category combination of the plurality of statically eligible feature category combinations is determined based at least in part on the plurality of static feature category counts for the particular statically eligible feature category combination and the plurality of feature category weights;
   determining one or more refined statically eligible feature category combinations by filtering the plurality of statically eligible feature category combinations based at least in part on one or more static refinement constraints;
   determining a plurality of dynamically eligible feature category combinations, wherein: (i) each dynamically eligible feature category combination of the plurality of dynamically eligible feature category combinations is characterized by a plurality of dynamic feature category counts for the plurality of feature categories, (ii) each dynamically eligible feature category combination of the plurality of dynamically eligible feature category combinations is associated with a dynamic cumulative weight of one or more dynamic cumulative weights that satisfies a dynamic cumulative weight threshold, and (iii) each dynamic cumulative weight of the one or more dynamic cumulative weights for a particular dynamically eligible feature category combination of the plurality of dynamically eligible feature category combinations is determined based at least in part on the plurality of dynamic feature category counts for the particular dynamically eligible feature category combination and the plurality of feature category weights;
   determining one or more refined dynamically eligible feature category combinations by filtering the plurality of dynamically eligible feature category combinations based at least in part on one or more dynamic refinement constraints;
   determining one or more refined eligible feature category combinations by filtering the one or more refined statically eligible feature category combinations based at least in part on the one or more refined dynamically eligible feature category combinations;
   determining a plurality of eligible feature combinations from the plurality of features, wherein the plurality of eligible feature combinations comprises, for each refined eligible feature category combination of the one or more refined eligible feature category combinations, a plurality of conforming feature combinations;
   for each eligible feature combination of the plurality of eligible feature combinations, determining an aggregate distance measure based at least in part on at least one of each current distance measure for each feature of the eligible feature combination or each historical distance measure for each feature of the eligible feature combination;
   selecting a refined eligible feature category combination of the one or more refined eligible feature category combinations based at least in part on the aggregate distance measure for each of the plurality of eligible feature combinations; and performing one or more actions based at least in part on the selected refined eligible feature category combination.

2. The computer-implemented method of claim 1, wherein the plurality of feature categories comprises a cross-temporal improvement feature category, and wherein the plurality of features comprises a cross-temporal improvement feature that is associated with the cross-temporal improvement feature category.

3. The computer-implemented method of claim 2, wherein:

for each particular eligible feature combination of the plurality of eligible feature combinations that is associated with an affirmative value for the cross-temporal improvement feature category, determining the aggregate distance measure based at least in part on both each current distance measure for each feature of the particular eligible feature combination and each historical distance measure for each feature of the particular eligible feature combination.

4. The computer-implemented method of claim 1, wherein the plurality of feature categories comprises a reward factor feature category and wherein the plurality of features comprises one or more reward factor features that are associated with the reward factor feature category.

5. The computer-implemented method of claim 4, wherein:

for each particular eligible feature combination of the plurality of eligible feature combinations that is associated with an affirmative value for at least one reward factor feature of the one or more reward factor features, excluding the particular eligible feature combination from the plurality of eligible feature combinations when the particular eligible feature combination fails to satisfy one or more reward factor criteria.

6. The computer-implemented method of claim 1, wherein determining the refined eligible feature category combination comprises:

determining the refined eligible feature category combination based at least in part on a selected eligible feature combination whose respective aggregate distance measure is lowest among respective aggregate distance measures of the one or more refined eligible feature category combinations.

7. The computer-implemented method of claim 1, wherein the one or more static refinement constraints comprise, for each feature category in a selected subset of the plurality of feature categories, a static count threshold.

8. The computer-implemented method of claim 1, wherein the one or more dynamic refinement constraints comprise, for each feature category in a selected subset of the plurality of feature categories, a dynamic count threshold.

9. A system for feature selection based at least in part on both temporally static feature selection criteria and temporally dynamic feature selection criteria, the system comprising one or more processors and memory including program code, the memory and the program code configured to, with the one or more processors, cause the system to at least:

identify a plurality of features, wherein: (i) each feature of the plurality of features is associated with a feature category of a plurality of feature categories, (ii) each feature category of the plurality of feature categories is associated with a feature category weight of a plurality of feature category weights, and (iii) each feature of the plurality of features is associated with a current distance measure and a historical distance measure;

determine a plurality of statically eligible feature category combinations, wherein: (i) each statically eligible feature category combination of the plurality of statically eligible feature category combinations is characterized by a plurality of static feature category counts for the plurality of feature categories, (ii) each statically eligible feature category combination of the plurality of statically eligible feature category combinations is associated with a static cumulative weight of one or more static cumulative weights that satisfies a static cumulative weight threshold, and (iii) each static cumulative weight of the one or more corresponding static cumulative weights for a particular statically eligible feature category combination of the plurality of statically eligible feature category combinations is determined based at least in part on the plurality of static feature category counts for the particular statically eligible feature category combination and the plurality of feature category weights;

determine one or more refined statically eligible feature category combinations by filtering the plurality of statically eligible feature category combinations based at least in part on one or more static refinement constraints;

determine a plurality of dynamically eligible feature category combinations, wherein: (i) each dynamically eligible feature category combination of the plurality of dynamically eligible feature category combinations is characterized by a plurality of dynamic feature category counts for the plurality of feature categories, (ii) each dynamically eligible feature category combination of the plurality of dynamically eligible feature category combinations is associated with a dynamic cumulative weight of one or more dynamic cumulative weights that satisfies a dynamic cumulative weight threshold, and (iii) each dynamic cumulative weight of the one or more dynamic cumulative weights for a particular dynamically eligible feature category combination of the plurality of dynamically eligible feature category combinations is determined based at least in part on the plurality of dynamic feature category counts for the particular dynamically eligible feature category combination and the plurality of feature category weights;

determine one or more refined dynamically eligible feature category combinations by filtering the plurality of dynamically eligible feature category combinations based at least in part on one or more dynamic refinement constraints;

determine one or more refined eligible feature category combinations by filtering the one or more refined statically eligible feature category combinations based at least in part on the one or more refined dynamically eligible feature category combinations;

determine a plurality of eligible feature combinations from the plurality of features, wherein the plurality of eligible feature combinations comprises, for each refined eligible feature category combination of the one or more refined eligible feature category combinations, a plurality of conforming feature combinations;

for each eligible feature combination of the plurality of eligible feature combinations, determine an aggregate distance measure based at least in part on at least one of each current distance measure for each feature of the eligible feature combination or each historical distance measure for each feature of the eligible feature combination;
select a refined eligible feature category combination of the one or more refined eligible feature category combinations based at least in part on the aggregate distance measure for each of the plurality of eligible feature combinations; and
perform one or more actions based at least in part on the selected refined eligible feature category combination.

10. The system of claim 9, wherein the plurality of feature categories comprises a cross-temporal improvement feature category, and wherein the plurality of features comprises a cross-temporal improvement feature that is associated with the cross-temporal improvement feature category.

11. The system of claim 10, wherein the memory and the program code are further configured to, with the one or more processors, cause the system to:
for each particular eligible feature combination of the plurality of eligible feature combinations that is associated with an affirmative value for the cross-temporal improvement feature category, determine the aggregate distance measure based at least in part on both each current distance measure for each feature of the particular eligible feature combination and each historical distance measure for each feature of the particular eligible feature combination.

12. The system of claim 9, wherein the plurality of feature categories comprises a reward factor feature category, and wherein the plurality of features comprises one or more reward factor features that are associated with the reward factor feature category.

13. The system of claim 12, wherein the memory and the program code are further configured to, with the one or more processors, cause the system to:
for each particular eligible feature combination of the plurality of eligible feature combinations that is associated with an affirmative value for at least one reward factor feature of the one or more reward factor features, exclude the particular eligible feature combination from the plurality of eligible feature combinations when the particular eligible feature combination fails to satisfy one or more reward factor criteria.

14. The system of claim 9, wherein to determine the refined eligible feature category combination, the memory and the program code are further configured to, with the one or more processors, cause the system to:
determine the refined eligible feature category combination based at least in part on a selected eligible feature combination whose respective aggregate distance measure is lowest among respective aggregate distance measures of the one or more refined eligible feature category combinations.

15. The system of claim 9, wherein the one or more static refinement constraints comprise, for each feature category in a selected subset of the plurality of feature categories, a static count threshold.

16. The system of claim 9, wherein the one or more dynamic refinement constraints comprise, for each feature category in a selected subset of the plurality of feature categories, a dynamic count threshold.

17. A computer program product for feature selection based at least in part on both temporally static feature selection criteria and temporally dynamic feature selection criteria, the computer program product comprising at least one non-transitory computer-readable storage medium having computer-readable program code portions stored therein, the computer-readable program code portions configured to:
identify a plurality of features, wherein: (i) each feature of the plurality of features is associated with a feature category of a plurality of feature categories, (ii) each feature category of the plurality of feature categories is associated with a feature category weight of a plurality of feature category weights, and (iii) each feature of the plurality of features is associated with a current distance measure and a historical distance measure;
determine a plurality of statically eligible feature category combinations, wherein: (i) each statically eligible feature category combination of the plurality of statically eligible feature category combinations is characterized by a plurality of static feature category counts for the plurality of feature categories, (ii) each statically eligible feature category combination of the plurality of statically eligible feature category combinations is associated with a static cumulative weight of one or more static cumulative weights that satisfies a static cumulative weight threshold, and (iii) each static cumulative weight of the one or more corresponding static cumulative weights for a particular statically eligible feature category combination of the plurality of statically eligible feature category combinations is determined based at least in part on the plurality of static feature category counts for the particular statically eligible feature category combination and the plurality of feature category weights;
determine one or more refined statically eligible feature category combinations by filtering the plurality of statically eligible feature category combinations based at least in part on one or more static refinement constraints;
determine a plurality of dynamically eligible feature category combinations, wherein: (i) each dynamically eligible feature category combination of the plurality of dynamically eligible feature category combinations is characterized by a plurality of dynamic feature category counts for the plurality of feature categories, (ii) each dynamically eligible feature category combination of the plurality of dynamically eligible feature category combinations is associated with a dynamic cumulative weight of one or more dynamic cumulative weights that satisfies a dynamic cumulative weight threshold, and (iii) each dynamic cumulative weight of the one or more dynamic cumulative weights for a particular dynamically eligible feature category combination of the plurality of dynamically eligible feature category combinations is determined based at least in part on the plurality of dynamic feature category counts for the particular dynamically eligible feature category combination and the plurality of feature category weights;
determine one or more refined dynamically eligible feature category combinations by filtering the plurality of dynamically eligible feature category combinations based at least in part on one or more dynamic refinement constraints;
determine one or more refined eligible feature category combinations by filtering the one or more refined statically eligible feature category combinations based at least in part on the one or more refined dynamically eligible feature category combinations;
determine a plurality of eligible feature combinations from the plurality of features, wherein the plurality of eligible feature combinations comprises, for each refined eligible feature category combination of the one or more refined eligible feature category combinations, a plurality of conforming feature combinations;

for each eligible feature combination of the plurality of eligible feature combinations, determine an aggregate distance measure based at least in part on at least one of each current distance measure for each feature of the eligible feature combination or each historical distance measure for each feature of the eligible feature combination;

select a refined eligible feature category combination of the one or more refined eligible feature category combinations based at least in part on the aggregate distance measure for each of the plurality of eligible feature combinations; and perform one or more actions based at least in part on the selected refined eligible feature category combination.

18. The computer program product of claim 17, wherein the plurality of feature categories comprises a cross-temporal improvement feature category, and wherein the plurality of features comprises a cross-temporal improvement feature that is associated with the cross-temporal improvement feature category.

19. The computer program product of claim 17, wherein the plurality of feature categories comprises a reward factor feature category, and wherein the plurality of features comprises one or more reward factor features that are associated with the reward factor feature category.

20. The computer program product of claim 17, wherein the computer-readable program code portions are further configured to:

for each particular eligible feature combination of the plurality of eligible feature combinations that is associated with an affirmative value for at least one reward factor feature of the one or more reward factor features, exclude the particular eligible feature combination from the plurality of eligible feature combinations when the particular eligible feature combination fails to satisfy one or more reward factor criteria.

* * * * *

UNITED STATES PATENT AND TRADEMARK OFFICE
CERTIFICATE OF CORRECTION

| | | |
|---|---|---|
| PATENT NO. | : 12,367,262 B2 | Page 1 of 1 |
| APPLICATION NO. | : 17/548987 | |
| DATED | : July 22, 2025 | |
| INVENTOR(S) | : Ciarán McKenna et al. | |

It is certified that error appears in the above-identified patent and that said Letters Patent is hereby corrected as shown below:

In the Claims

In Column 37, Line 26, Claim 4, delete "category" and insert -- category, --, therefor.

Signed and Sealed this
Eleventh Day of November, 2025

John A. Squires
*Director of the United States Patent and Trademark Office*